(12) United States Patent
Shikata et al.

(10) Patent No.: US 8,753,207 B2
(45) Date of Patent: Jun. 17, 2014

(54) GAME SYSTEM, GAME PROCESSING METHOD, RECORDING MEDIUM STORING GAME PROGRAM, AND GAME DEVICE

(75) Inventors: Hiromasa Shikata, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/356,033

(22) Filed: Jan. 23, 2012

(65) Prior Publication Data

US 2013/0090168 A1 Apr. 11, 2013

(30) Foreign Application Priority Data

Oct. 11, 2011 (JP) ................................. 2011-223597

(51) Int. Cl.
*A63F 13/04* (2006.01)

(52) U.S. Cl.
CPC ......... *A63F 13/04* (2013.01); *A63F 2300/6054* (2013.01); *A63F 2300/6676* (2013.01); *A63F 2300/1006* (2013.01); *A63F 2300/105* (2013.01)
USPC ...................... 463/37; 463/1; 463/31; 463/38

(58) Field of Classification Search
CPC ......... A63F 13/00; A63F 13/04; A63F 13/06; A63F 2300/10; A63F 2300/1006; A63F 2300/1018; A63F 2300/105; A63F 2300/6045; A63F 2300/6054; A63F 2300/6676
USPC ..................... 463/1, 31–33, 36–38
See application file for complete search history.

(56) References Cited

U.S. PATENT DOCUMENTS

| 7,115,031 B2 | 10/2006 | Miyamoto et al. |
| 7,690,992 B2 | 4/2010 | Itou et al. |
| 2002/0082008 A1* | 6/2002 | Nelson ........................... 455/431 |
| 2002/0103031 A1* | 8/2002 | Neveu et al. ..................... 463/49 |

(Continued)

FOREIGN PATENT DOCUMENTS

| JP | 2002253848 A | * | 9/2002 |
| JP | 4473688 | | 3/2010 |

OTHER PUBLICATIONS

Official Guidebook "007 GoldenEye" of Nintendo Co., Ltd., p. 5, Oct. 10, 1998, with a partial English translation, 5 pages.
Halo 3 game manual (released on Sep. 25, 2007), pp. 1-33.

(Continued)

*Primary Examiner* — Arthur O Hall
*Assistant Examiner* — Jasson Yoo
(74) *Attorney, Agent, or Firm* — Nixon & Vanderhye, P.C.

(57) ABSTRACT

In an example game device, a second character is caused to rotate based on an input operation performed on a stick of a terminal device and a change in an attitude of the terminal device. In the game device, when an enemy character is present behind the second character, a rotation angle based on an input operation performed on the stick is adjusted so that the second character is easily caused to face the enemy character. In the game device, when an orientation of the second character is changed based on the change in the attitude of the terminal device, a rotation angle based on the change in the attitude of the terminal device is adjusted so that the second character is easily caused to face the enemy character. In the game device, the second character is caused to rotate based the adjusted rotation angle.

28 Claims, 18 Drawing Sheets

(56) References Cited

U.S. PATENT DOCUMENTS

2003/0216176 A1  11/2003  Shimizu et al.
2006/0178179 A1* 8/2006  Neveu et al. .................. 463/5
2009/0048018 A1* 2/2009  Sayyadi et al. ............... 463/32
2009/0325660 A1* 12/2009 Langridge ..................... 463/2
2010/0009733 A1* 1/2010  Garvin et al. .................. 463/5

OTHER PUBLICATIONS

Halo 3 Walkthrough Strategy Guide Vehicles, released on Sep. 25, 2007, retrieved on Feb. 22, 2012 from http://mycheats.1 up.com/view/section/3144308/19407/halo_3/xbox_360, pp. 1-5.

Apr. 2, 2013 Office Action in U.S. Appl. No. 13/355,889, 22 pages.

* cited by examiner

GAME SYSTEM, GAME PROCESSING METHOD, RECORDING MEDIUM STORING GAME PROGRAM, AND GAME DEVICE

CROSS REFERENCE TO RELATED APPLICATION

The disclosure of Japanese Patent Application No. 2011-223597, filed on Oct. 11, 2011, is incorporated herein by reference.

FIELD

The technology disclosed herein relates to game systems, game processing methods, recording media storing game programs, and game devices which are used to execute a process for a game.

BACKGROUND AND SUMMARY

Conventionally, there are game devices in which a player object can be caused to move or change its direction based on an input operation performed by a player using a direction input section. For example, there is a game in which the player object is caused to move forward and backward by moving a stick in up and down directions, and to rotate by moving the stick in left and right directions. In such a game, an orientation and a position of the player object are changed based on a player's input.

However, in conventional games, a player's input is directly used to control the orientation and position of a player object, and the player object cannot be necessarily easily caused to correctly perform a motion which is intended by the player.

An object of an exemplary embodiment is to provide a game system, game processing method, game program, and game device in which a player object can be easily caused to correctly perform a motion which is intended by a player.

In order to achieve the object, the present exemplary embodiment has a configuration as follows.

An exemplary embodiment is a game system for controlling a player object provided in a virtual world based on input data representing an input operation performed by a player using an input device. The game system includes an input data obtaining section, a setting section, an adjustment section, and an attitude changing section. The input data obtaining section obtains the input data. The setting section sets, based on the input data, control data representing a direction and amount of a change in an orientation of the player object in the virtual world. The adjustment section adjusts the control data so that when the player object and a predetermined other object have a predetermined position relationship, the player object is easily caused to face in a predetermined direction. The attitude changing section changes an attitude of the player object based on the control data.

With the above configuration, the control data representing the change direction and change amount of the orientation of the player object is set based on the input data. When the player object and the predetermined other object have the predetermined position relationship, the control data can be adjusted so that the player object is easily caused to face in the predetermined direction. As a result, when the player object and the predetermined other object have the predetermined position relationship, the player object can be easily caused to face in the predetermined direction.

In another configuration, the adjustment section may adjust the control data so that the player object is easily caused to face the other object.

With the above configuration, the player object can be easily caused to face the other object.

In another configuration, the adjustment section may adjust the control data so that when the other object is located behind the player object, the player object is easily caused to face the other object.

With the above configuration, when the other object is located behind the player object, the player object can be easily caused to face the other object.

In another configuration, the game system may further include a degree calculation section configured to calculate a degree of a match between a specific direction as viewed from the player object and a direction from the player object toward the other object. The adjustment section may adjust the control data based on the degree.

With the above configuration, the control data can be adjusted based on the degree. For example, the degree may increase as the other object is closer to a position directly behind the player object. Alternatively, the degree may increase as the other object is closer to a position directly to the right of the player object.

In another configuration, the degree may increase as the other object is closer to a position directly behind the player object. In this case, the adjustment section may adjust the control data so that the player object is more easily caused to face the other object as the degree increases.

With the above configuration, as the other object is closer to a position directly behind the player object, the player object can be more easily caused to face the other object.

In another configuration, the input data may include attitude data based on the attitude of the input device. The game system may further include an attitude obtaining section configured to obtain the attitude of the input device based on the attitude data. The setting section may set the control data based on the attitude of the input device.

With the above configuration, the attitude of the input device can be obtained, and the control data can be set based on the attitude of the input device.

In another configuration, the setting section may set the control data so that the orientation of the player object is changed by a first change amount corresponding to a change amount of the attitude of the input device. In this case, the adjustment section may adjust the control data so that when the player object and the other object have the predetermined position relationship, the orientation of the player object is changed by a second change amount larger than the first change amount.

With the above configuration, the orientation of the player object can be changed based on the first change amount corresponding to the change amount of the attitude of the input device. When the player object and the other object have the predetermined position relationship, the orientation of the player object can be changed by a larger amount.

In another configuration, the setting section may set the control data so that the orientation of the player object is changed toward a direction in the virtual world corresponding to a direction in which the attitude of the input device has been changed, by the first change amount corresponding to the change amount of the attitude of the input device. The adjustment section may adjust the control data so that when the direction in the virtual world corresponding to the direction in which the attitude of the input device has been changed is a direction in which the player object faces the other object, the orientation of the player object is changed by the second change amount larger than the first change amount.

With the above configuration, the orientation of the player object can be changed based on the change direction and change amount of the attitude of the input device. When the attitude of the input device is changed toward the direction in which the player object faces the other object, the orientation of the player object can be changed by a larger amount.

In another configuration, the input data may include direction data corresponding to an input operation performed on a direction input section included in the input device. The setting section may set the control data based on the direction data.

With the above configuration, the control data can be set based on an input operation performed on the direction input section.

In another configuration, the game system may further include a movement section configured to cause the player object to move in the virtual world based on the direction data.

With the above configuration, the player object can be caused to move in the virtual world based on an input operation performed on the direction input section.

In another configuration, when the player object and the other object have the predetermined position relationship, then if a movement direction of the player object represented by the direction data is a direction in which the player object faces the other object, the movement section may limit a movement of the player object. The adjustment section may adjust the control data so that when the player object and the other object have the predetermined position relationship, then if the movement direction of the player object represented by the direction data is a direction in which the player object faces the other object, the player object is caused to face the other object.

With the above configuration, the player object can be caused to move based on an input operation performed on the direction input section. When the player object and the other object have the predetermined position relationship, then if the movement direction represented by the direction data is a direction in which the player object faces the other object, the movement of the player object can be limited. In this case, the control data can be adjusted so that the player object faces the other object.

In another configuration, the input device may be a portable display device including a display section. The game system may further include a virtual camera setting section and a display control section. The virtual camera setting section sets a virtual camera in the virtual world based on the orientation of the player object. The display control section causes the display section to display an image of the virtual world captured by the virtual camera.

With the above configuration, a virtual camera can be set based on the orientation of the player object, and an image of the virtual space captured by the virtual camera can be displayed on the portable display device.

In another configuration, the other object may be an enemy object which is allowed to move in the virtual world. The game system may further include an attack control section configured to cause the player object to attack the enemy object based on the input data.

With the above configuration, a game can be provided in which a player object is caused to attack an enemy object.

Another exemplary embodiment may be a game device included in the game system. Still another exemplary embodiment may be in the form of a game program which causes a computer included in the game system to function each of the above sections. Still another exemplary embodiment may be in the form of a game processing method which is performed in the game device or the game system. The game system may be implemented by a plurality of devices which cooperate with each other or a single device.

According to the present exemplary embodiment, a player can cause a player object to correctly perform a motion which is intended by the player.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 11 is a non-limiting example diagram showing details of a movement of the first character 91a;

DETAILED DESCRIPTION OF NON-LIMITING EXAMPLE EMBODIMENTS

[1. General Configuration of Game System]

Figure 1:
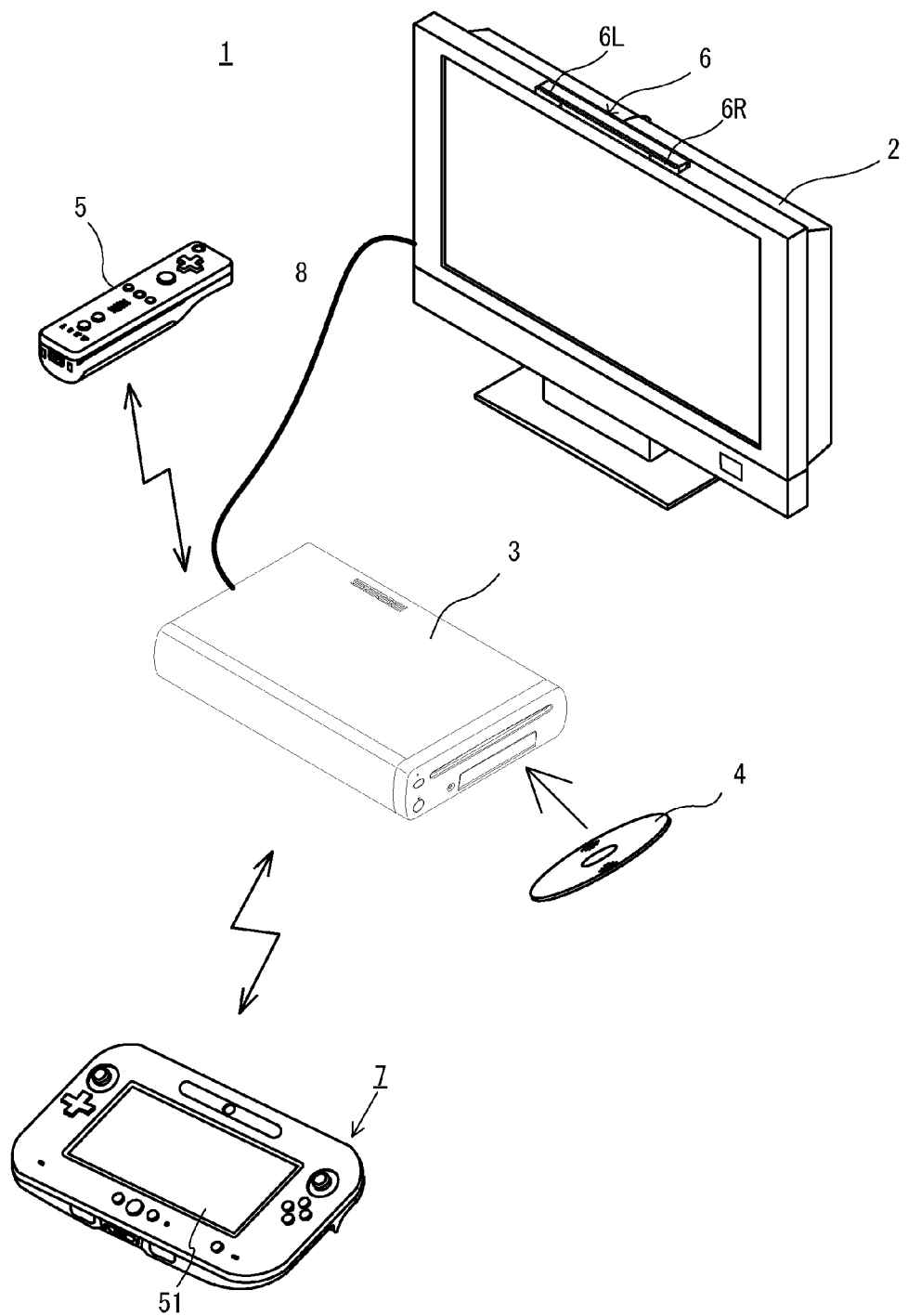
FIG. 1 is a non-limiting example external view of a game system 1.

A game system 1 will now be described with reference to the drawings. FIG. 1 is a non-limiting example external view of the game system 1. In FIG. 1, a game system 1 includes a non-portable display device (hereinafter referred to as a "television") 2 such as a television receiver, a console-type game device 3, an optical disc 4, a controller 5, a marker device 6, and a terminal device 7. In the game system 1, the game device 3 performs a game process based on a game operation performed using the controller 5, and displays a game image obtained through the game process on the television 2 and/or the terminal device 7.

In the game device 3, the optical disc 4 typifying an interchangeable information storage medium used for the game device 3 is removably inserted. An information processing program (a game program, for example) to be executed by the game device 3 is stored on the optical disc 4. The game device 3 has, on a front surface thereof, an insertion opening for the optical disc 4. The game device 3 reads and executes the information processing program stored on the optical disc 4 which has been inserted in the insertion opening, to perform a game process.

The television 2 is connected to the game device 3 by a connecting cord. A game image obtained as a result of a game process performed by the game device 3 is displayed on the television 2. The television 2 includes a speaker 2a (see FIG. 2) which outputs a game sound obtained as a result of the game process. In alternative embodiments, the game device 3 and the non-portable display device may be an integral unit. Also, the communication between the game device 3 and the television 2 may be wireless communication.

The marker device 6 is provided along the periphery of the screen (on the upper side of the screen in FIG. 1) of the television 2. The user (player) can perform a game operation by moving the controller 5, details of which will be described later. The marker device 6 is used by the game device 3 for calculating a movement, a position, an attitude, etc., of the controller 5. The marker device 6 includes two markers 6R and 6L at opposite ends thereof. Specifically, the marker 6R (as well as the marker 6L) includes one or more infrared light emitting diodes (LEDs), and emits infrared light in a forward direction of the television 2. The marker device 6 is connected to the game device 3 via either a wired or wireless connection, and the game device 3 is able to control the lighting of each infrared LED of the marker device 6. Note that the marker device 6 is movable, and the user can place the marker device 6 at any position. While FIG. 1 shows an embodiment in which the marker device 6 is placed on top of the television 2, the position and direction of the marker device 6 are not limited to this particular arrangement.

The controller 5 provides the game device 3 with operation data representing the content of an operation performed on the controller itself. The controller 5 and the game device 3 can communicate with each other via wireless communication. In the present embodiment, the controller 5 and the game device 3 use, for example, Bluetooth (Registered Trademark) technology for the wireless communication therebetween. In other embodiments, the controller 5 and the game device 3 may be connected via a wired connection. While only one controller is included in the game system 1 in the present embodiment, a plurality of controllers may be included in the game system 1. In other words, the game device 3 can communicate with a plurality of controllers. Multiple players can play a game by using a predetermined number of controllers at the same time. The detailed configuration of the controller 5 will be described below.

The terminal device 7 is sized to be grasped by the user's hand or hands. The user can hold and move the terminal device 7, or can place and use the terminal device 7 at an arbitrary position. The terminal device 7, whose detailed configuration will be described below, includes a liquid crystal display (LCD) 51 as a display, and input mechanisms (e.g., a touch panel 52, a gyroscopic sensor 74, etc., to be described later). The terminal device 7 and the game device 3 can communicate with each other via a wireless connection (or via a wired connection). The terminal device 7 receives from the game device 3 data of an image (e.g., a game image) generated by the game device 3, and displays the image on the LCD 51. While an LCD is used as the display device in the embodiment, the terminal device 7 may include any other display device such as a display device utilizing electroluminescence (EL), for example. The terminal device 7 transmits operation data representing the content of an operation performed on the terminal device itself to the game device 3.

[2. Internal Configuration of Game Device 3]

Figure 2:
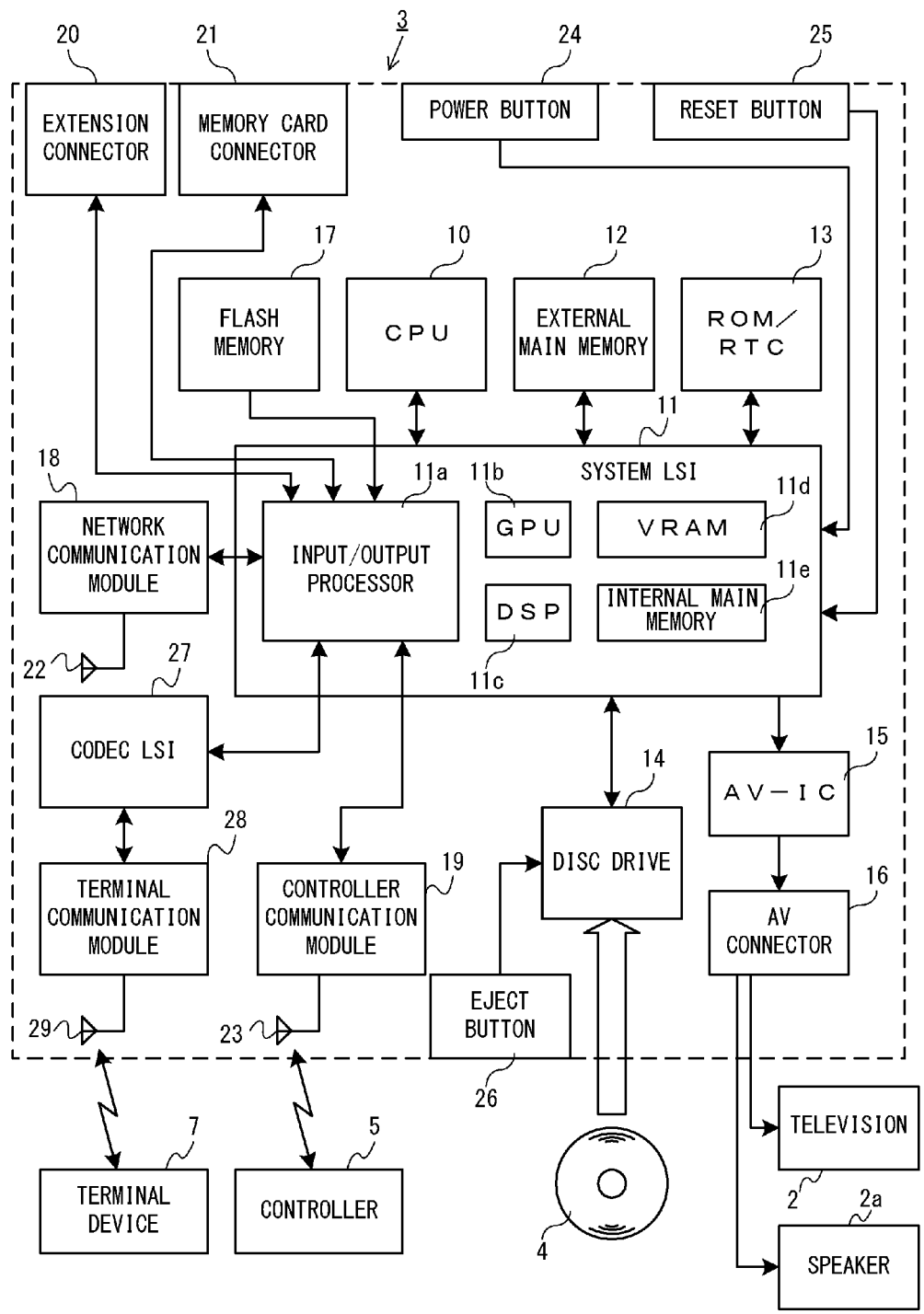
FIG. 2 is a non-limiting example block diagram showing a configuration of a game device 3.

Next, an internal configuration of the game device 3 will be described with reference to FIG. 2. FIG. 2 is a non-limiting example block diagram showing the internal configuration of the game device 3. The game device 3 includes a CPU 10, a system LSI 11, an external main memory 12, a ROM/RTC 13, a disc drive 14, and an AV-IC 15.

The CPU 10 performs a game process by executing a game program stored on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs the following processes: controlling data transmission between each component connected thereto; generating an image to be displayed; acquiring data from an external device(s); and the like. The internal configuration of the system LSI 11 will be described below. The external main memory 12, which is of a volatile type, stores a program such as a game program read from the optical disc 4, a game program read from a flash memory 17, or the like, and various data. The external main memory 12 is used as a work area and a buffer area for the CPU 10. The ROM/RTC 13 includes a ROM (a so-called boot ROM) containing a boot program for the game device 3, and a clock circuit (real time clock (RTC)) for counting time. The disc drive 14 reads program data, texture data, and the like from the optical disc 4, and writes the read data into an internal main memory 11e (to be described below) or the external main memory 12.

The system LSI 11 includes an input/output processor (I/O processor) 11a, a graphics processor unit (GPU) 11b, a digital signal processor (DSP) 11c, a video RAM (VRAM) 11d, and the internal main memory 11e. Although not shown in the figures, these components 11a to 11e are connected to each other through an internal bus.

The GPU 11b, which forms a part of a rendering mechanism, generates an image in accordance with a graphic command (rendering command) from the CPU 10. The VRAM 11d stores data (data such as polygon data and texture data) required by the GPU 11b to execute graphics commands. When an image is generated, the GPU 11b generates image data using data stored in the VRAM 11d. In the present embodiment, the game device 3 generates both a game image to be displayed on the television 2 and a game image to be displayed on the terminal device 7. The game image to be displayed on the television 2 may also be hereinafter referred to as a "television game image," and the game image to be displayed on the terminal device 7 may also be hereinafter referred to as a "terminal game image."

The DSP 11c, which functions as an audio processor, generates audio data using sound data and sound waveform (e.g., tone quality) data stored in one or both of the internal main memory 11e and the external main memory 12. In the present embodiment, game audio is output from the speaker of the television 2, and game audio is output from the speaker of the terminal device 7.

As described above, of images and audio generated in the game device 3, data of an image and audio to be output from the television 2 is read out by the AV-IC 15. The AV-IC 15 outputs the read image data to the television 2 via an AV connector 16, and outputs the read audio data to the speaker 2a provided in the television 2. Thus, images are displayed on the television 2, and sound is output from the speaker 2a.

Of images and audio generated in the game device 3, data of an image and audio to be output from the terminal device 7 is transmitted to the terminal device 7 by an input/output processor 11a, etc. The data transmission to the terminal device 7 by the input/output processor 11a, or the like, will be described below.

The input/output processor 11a exchanges data with components connected thereto, and downloads data from an external device(s). The input/output processor 11a is connected to the flash memory 17, a network communication module 18, a controller communication module 19, an extension connector 20, a memory card connector 21, and a codec LSI 27. An antenna 22 is connected to the network communication module 18. An antenna 23 is connected to the controller communication module 19. The codec LSI 27 is connected to a terminal communication module 28, and an antenna 29 is connected to the terminal communication module 28.

The game device 3 can be connected to a network such as the Internet to communicate with external information processing devices (e.g., other game devices, various servers, computers, etc.). That is, the input/output processor 11a can be connected to a network such as the Internet via the network communication module 18 and the antenna 22 to communicate with an external information processing device(s) connected to the network. The input/output processor 11a regularly accesses the flash memory 17 to detect the presence or absence of any data which needs to be transmitted to the network, and when there is data, transmits the data to the network via the network communication module 18 and the antenna 22. The input/output processor 11a also receives data transmitted from an external information processing device and data downloaded from a download server via the network, the antenna 22, and the network communication module 18, and stores the received data into the flash memory 17. The CPU 10 executes a game program to read data stored in the flash memory 17 and use the data in the game program. The flash memory 17 may store saved game data (e.g., data representing game results or data representing intermediate game results) of a game played using the game device 3 in addition to data exchanged between the game device 3 and an external information processing device. The flash memory 17 may also store a game program(s).

The game device 3 can receive operation data from the controller 5. That is, the input/output processor 11a receives operation data transmitted from the controller 5 via the antenna 23 and the controller communication module 19, and stores (temporarily) the data in a buffer area of the internal main memory 11e or the external main memory 12.

The game device 3 can exchange data such as images and audio with the terminal device 7. When transmitting a game image (terminal game image) to the terminal device 7, the input/output processor 11a outputs data of the game image generated by the GPU 11b to the codec LSI 27. The codec LSI 27 performs a predetermined compression process on the image data from the input/output processor 11a. The terminal communication module 28 wirelessly communicates with the terminal device 7. Therefore, the image data compressed by the codec LSI 27 is transmitted by the terminal communication module 28 to the terminal device 7 via the antenna 29. In the present embodiment, the image data transmitted from the game device 3 to the terminal device 7 is image data used in a game, and the playability of a game can be adversely influenced if there is a delay in displaying an image in the game. Therefore, it is preferred to eliminate a delay as much as possible in transmission of image data from the game device 3 to the terminal device 7. Therefore, in the present embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using, for example, a multiple input multiple output (MIMO) technique employed in the IEEE 802.11n standard, or other communication schemes.

The game device 3 transmits audio data to the terminal device 7, in addition to image data. That is, the input/output processor 11a outputs audio data generated by the DSP 11c to the terminal communication module 28 via the codec LSI 27. The codec LSI 27 performs a compression process on audio data, as with image data. While the compression scheme for audio data may be any scheme, it is preferably a scheme with a high compression ratio and less audio degradation. In other embodiments, audio data may be transmitted uncompressed. The terminal communication module 28 transmits the compressed image data and audio data to the terminal device 7 via the antenna 29.

The game device 3 can receive various data from the terminal device 7. In the present embodiment, the terminal device 7 transmits operation data, image data, and audio data, details of which will be described below. These pieces of data transmitted from the terminal device 7 are received by the terminal communication module 28 via the antenna 29. The image data and the audio data transmitted from the terminal device 7 has been subjected to a compression process similar to that on image data and audio data transmitted from the game device 3 to the terminal device 7. Therefore, the compressed image data and audio data are sent from the terminal communication module 28 to the codec LSI 27, which in turn performs a decompression process on the pieces of data and outputs the resulting pieces of data to the input/output processor 11a. On the other hand, the operation data from the terminal device 7 may not be subjected to a compression process since the amount of the data is small as compared with images and audio. It may or may not be encrypted as necessary. After being received by the terminal communication module 28, the operation data is output to the input/output processor 11a via the codec LSI 27. The input/output processor 11a stores (temporarily) data received from the terminal device 7 in a buffer area of the internal main memory 11e or the external main memory 12.

The game device 3 can be connected to another device or an external storage medium. That is, the input/output processor 11a is connected to the extension connector 20 and the memory card connector 21. The extension connector 20 is a connector for an interface, such as a USB or SCSI interface. The extension connector 20 can receive a medium such as an external storage medium, a peripheral device such as another controller, or a wired communication connector which enables communication with a network in place of the network communication module 18. The memory card connector 21 is a connector for connecting, to the game device 3, an external storage medium such as a memory card. For example, the input/output processor 11a can access an external storage medium via the extension connector 20 or the memory card connector 21 to store data into the external storage medium or read data from the external storage medium.

The game device 3 includes a power button 24, a reset button 25, and an eject button 26. The power button 24 and the reset button 25 are connected to the system LSI 11. When the power button 24 is turned on, power is supplied to components of the game device 3 from an external power supply through an AC adaptor (not shown). When the reset button 25 is pressed, the system LSI 11 restarts the boot program of the game device 3. The eject button 26 is connected to the disc drive 14. When the eject button 26 is pressed, the optical disc 4 is ejected from the disc drive 14.

In other embodiments, some of the components of the game device 3 may be provided as extension devices separate from the game device 3. In this case, an extension device may be connected to the game device 3 via the extension connector 20, for example. Specifically, an extension device may include components of the codec LSI 27, the terminal communication module 28, and the antenna 29, for example, and can be attached/detached to/from the extension connector 20. In this case, by connecting the extension device to a game device which does not include the above components, the game device can communicate with the terminal device 7.

[3. Configuration of Controller 5]

Figure 3:
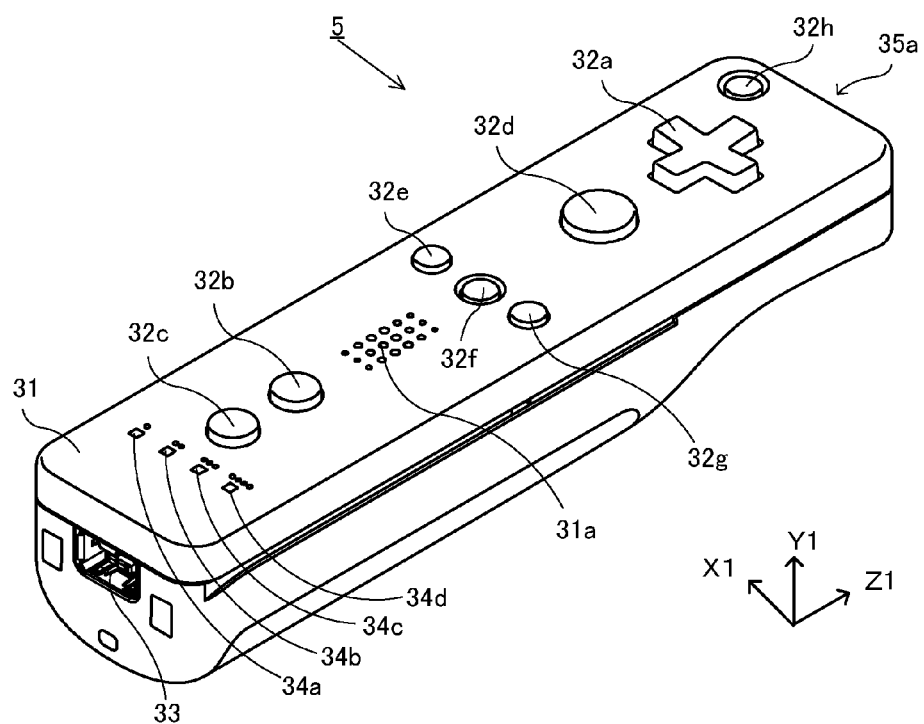
FIG. 3 is a non-limiting example perspective view showing an external configuration of a controller 5.
Figure 4:
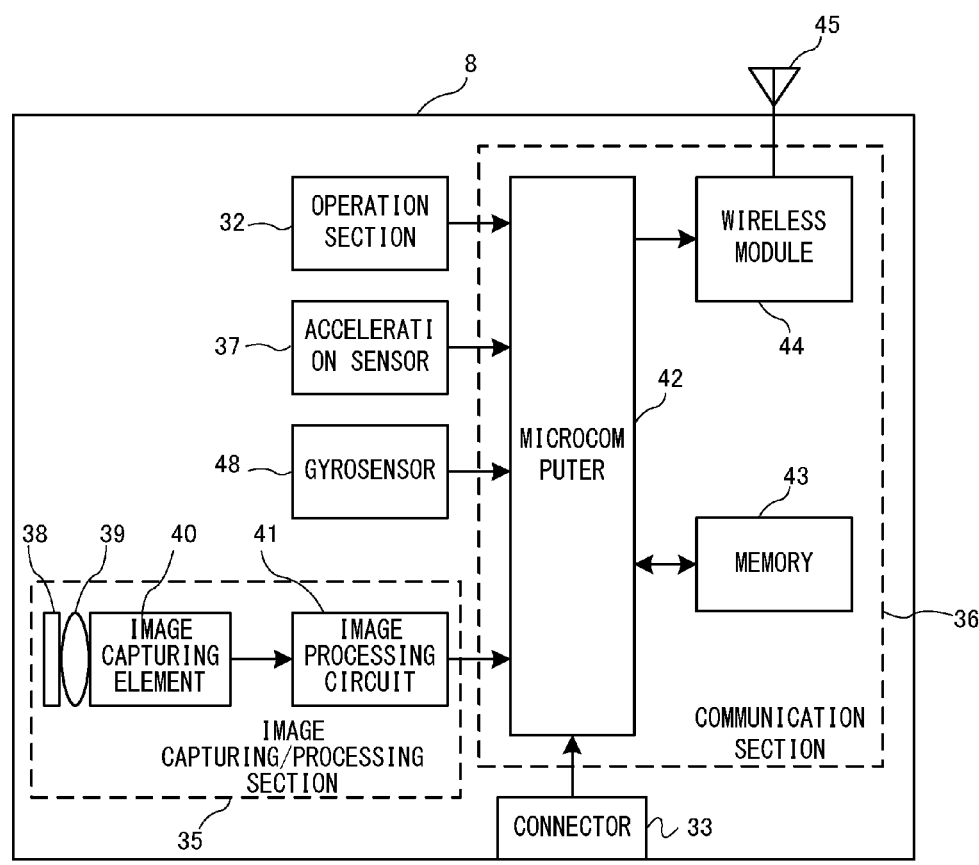
FIG. 4 is a non-limiting example block diagram showing an internal configuration of the controller 5.

Next, with reference to FIGS. 3 and 4, the controller 5 will be described. FIG. 3 is a non-limiting example perspective view showing an external configuration of the controller 5. FIG. 4 is a non-limiting example block diagram showing an internal configuration of the controller 5. The perspective view of FIG. 3 shows the controller 5 as viewed from the top and the rear.

As shown in FIGS. 3 and 4, the controller 5 has a housing 31 formed by, for example, plastic molding. The housing 31 has a generally parallelepiped shape extending in a longitudinal (front-rear) direction (Z1-axis direction shown in FIG. 3), and is sized to be grasped by one hand of an adult or a child. The user can perform game operations by pressing buttons provided on the controller 5, and by moving the controller 5 itself to change the position and attitude (tilt) thereof.

The housing 31 has a plurality of operation buttons. As shown in FIG. 3, on a top surface of the housing 31, a cross button 32a, a first button 32b, a second button 32c, an "A" button 32d, a minus button 32e, a home button 32f, a plus button 32g, and a power button 32h are provided. A recessed portion is formed on a bottom surface of the housing 31, and a "B" button 32i is provided on a rear, sloped surface of the recessed portion. The operation buttons 32a to 32i are assigned, as necessary, their respective functions in accordance with the game program executed by the game device 3. The power button 32h is used to remotely turn on and off the game device 3.

On a rear surface of the housing 31, the connector 33 is provided. The connector 33 is used to connect other devices (e.g., a sub-controller having an analog stick, other sensor units, etc.) to the controller 5.

In a rear portion of the top surface of the housing 31, a plurality (four in FIG. 3) of LEDs 34a to 34d are provided. The controller 5 is assigned a controller type (number) so as to be distinguishable from other controllers.

The controller 5 also has an image capturing/processing section 35 (FIG. 4), and a light incident surface 35a of an image capturing/processing section 35 is provided on a front surface of the housing 31. The light incident surface 35a is made of a material which transmits at least infrared light emitted from the markers 6R and 6L.

On the top surface of the housing 31, sound holes 31a through which sound from a speaker provided in the controller 5 is emitted out are provided between the first button 32b and the home button 32f.

Note that the shape of the controller 5, the shapes of the operation buttons, etc., are only for illustrative purposes. Other shapes, numbers, and positions are possible.

FIG. 4 is a non-limiting example block diagram showing an internal configuration of the controller 5. The controller 5 includes an operation section 32 (the operation buttons 32a to 32i), the image capturing/processing section 35, a communication section 36, the acceleration sensor 37, and a gyroscopic sensor 48. The controller 5 transmits data representing the content of an operation performed on the controller itself, as operation data, to the game device 3. The operation data transmitted by the controller 5 may also be hereinafter referred to as "controller operation data," and the operation data transmitted by the terminal device 7 may also be hereinafter referred to as "terminal operation data."

The operation section 32 includes the operation buttons 32a to 32i described above, and outputs, to the microcomputer 42 of the communication section 36, operation button data indicating the input states of the operation buttons 32a to 32i (e.g., whether or not the operation buttons 32a to 32i are pressed).

The image capturing/processing section 35 includes a infrared filter 38, a lens 39, an image capturing element 40, and an image processing circuit 41. The infrared filter 38 transmits only infrared light contained in light incident on the front surface of the controller 5. The lens 39 collects the infrared light transmitted through the infrared filter 38 so that the light is incident on the image capturing element 40. The image capturing element 40 is a solid-state image capturing device, such as, for example, a CMOS sensor or a CCD sensor, which receives the infrared light collected by the lens 39, and outputs an image signal. The marker section 55 of the terminal device 7 and the marker device 6 of which images are to be captured are formed by markers which output infrared light. Therefore, the infrared filter 38 enables the image capturing element 40 to receive only the infrared light transmitted through the infrared filter 38 and generate image data, whereby an image of an object to be imaged (the marker section 55 and/or the marker device 6) can be captured more accurately. In the description that follows, the image data generated by the image capturing element 40 is processed by the image processing circuit 41. The image processing circuit 41 calculates a position of the object to be imaged within the captured image. The image processing circuit 41 outputs coordinates of the calculated position to the microcomputer 42 of the communication section 36. The data representing the coordinates is transmitted as operation data to the game device 3 by the microcomputer 42. The coordinates are hereinafter referred to as "marker coordinates." The marker coordinates change depending on an orientation (a tilt angle) and/or a position of the controller 5 itself, and therefore, the game device 3 can calculate the orientation and position of the controller 5 using the marker coordinates.

The acceleration sensor 37 detects accelerations (including a gravitational acceleration) of the controller 5. While the acceleration sensor 37 is assumed to be an electrostatic capacitance type micro-electromechanical system (MEMS) acceleration sensor, other types of acceleration sensors may be used.

In the present embodiment, the acceleration sensor 37 detects a linear acceleration in each of three axial directions, i.e., the up-down direction (Y1-axis direction shown in FIG. 3), the left-right direction (the X1-axis direction shown in FIG. 3), and the front-rear direction (the Z1-axis direction shown in FIG. 3) of the controller 5.

Data (acceleration data) representing the acceleration detected by the acceleration sensor 37 is output to the communication section 36. The acceleration detected by the acceleration sensor 37 changes depending on the orientation (tilt angle) and the movement of the controller 5 itself, and therefore, the game device 3 is capable of calculating the orientation (attitude) and the movement of the controller 5 using the obtained acceleration data.

One skilled in the art will readily understand from the description herein that additional information relating to the controller 5 can be estimated or calculated (determined) through a process by a computer, such as a processor (for example, the CPU 10) of the game device 3 or a processor (for example, the microcomputer 42) of the controller 5, based on an acceleration signal output from the acceleration sensor 37 (this applies also to an acceleration sensor 73 to be described later). For example, assuming that the computer performs a process on the premise that the controller 5 including the acceleration sensor 37 is in the static state (that is, in the case in which the process is performed on the premise that the acceleration detected by the acceleration sensor contains only the gravitational acceleration), when the controller 5 is actually in the static state, it is possible to determine whether or not or how much the controller 5 is tilted relative to the direction of gravity, based on the detected acceleration. Specifically, when the state in which the detection axis of the acceleration sensor 37 faces vertically downward is used as a reference, whether or not the controller 5 is tilted relative to the reference can be determined based on whether or not 1 G (gravitational acceleration) is present, and the degree of tilt of the controller 5 relative to the reference can be determined based on the magnitude thereof. The multi-axis acceleration sensor 37 can more precisely determine the degree of tilt of the controller 5 relative to the direction of gravity by performing a process on the acceleration signals of the axes. In this case, the processor may calculate, based on the output from the acceleration sensor 37, the tilt angle of the controller 5, or the tilt direction of the controller 5 without calculating the tilt angle. Thus, by using the acceleration sensor 37 in combination with the processor, it is possible to determine the tilt angle or the attitude of the controller 5.

On the other hand, when it is assumed that the controller 5 is in the dynamic state (in which the controller 5 is being moved), the acceleration sensor 37 detects the acceleration based on the movement of the controller 5, in addition to the gravitational acceleration, and it is therefore possible to determine the movement direction of the controller 5 by removing the gravitational acceleration component from the detected acceleration through a predetermined process. Even when it is assumed that the controller 5 is in the dynamic state, it is possible to determine the tilt of the controller 5 relative to the direction of gravity by removing the acceleration component based on the movement of the acceleration sensor from the detected acceleration through a predetermined process. In other embodiments, the acceleration sensor 37 may include an embedded processor or another type of dedicated processor for performing a predetermined process on an acceleration signal detected by a built-in acceleration detector before the acceleration signal is output to the microcomputer 42. For example, when the acceleration sensor 37 is used to detect a static acceleration (for example, the gravitational acceleration), the embedded or dedicated processor may convert the acceleration signal to a tilt angle (or other preferred parameters).

The gyroscopic sensor 48 detects angular velocities about three axes (the X1-, Y1-, and Z1-axes in the embodiment). In the present specification, with respect to the image capturing direction (the Z1-axis positive direction) of the controller 5, a rotation direction about the X1-axis is referred to as a pitch direction, a rotation direction about the Y1-axis as a yaw direction, and a rotation direction about the Z1-axis as a roll direction. The number and combination of gyroscopic sensors to be used are not limited to any particular number and combination as long as the gyroscopic sensor 48 can detect angular velocities about three axes. For example, the gyroscopic sensor 48 may be a 3-axis gyroscopic sensor, or angular velocities about three axes may be detected by a combination of a 2-axis gyroscopic sensor and a 1-axis gyroscopic sensor. Data representing the angular velocity detected by the gyroscopic sensor 48 is output to the communication section 36. The gyroscopic sensor 48 may be a gyroscopic sensor that detects an angular velocity or velocities about one axis or two axes.

The communication section 36 includes the microcomputer 42, a memory 43, the wireless module 44, and the antenna 45. The microcomputer 42 controls the wireless module 44 for wirelessly transmitting, to the game device 3, data acquired by the microcomputer 42 while using the memory 43 as a storage area in the process.

Pieces of data output from the operation section 32, the image capturing/processing section 35, the acceleration sensor 37, and the gyroscopic sensor 48 to the microcomputer 42 are temporarily stored in the memory 43. These pieces of data are transmitted as the operation data (controller operation data) to the game device 3.

As described above, as operation data representing an operation performed on the controller itself, the controller 5 can transmit marker coordinate data, acceleration data, angular velocity data, and operation button data. The game device 3 performs a game process using the operation data as a game input. Therefore, by using the controller 5, the user can perform a game operation of moving the controller 5 itself, in addition to a conventional typical game operation of pressing the operation buttons. Examples of the game operation of moving the controller 5 itself include an operation of tilting the controller 5 to an intended attitude, an operation of specifying an intended position on the screen with the controller 5, etc.

While the controller 5 does not include a display for displaying a game image in the embodiment, it may include a display for displaying, for example, an image representing a battery level, etc.

[4. Configuration of Terminal Device 7]

Figure 5:
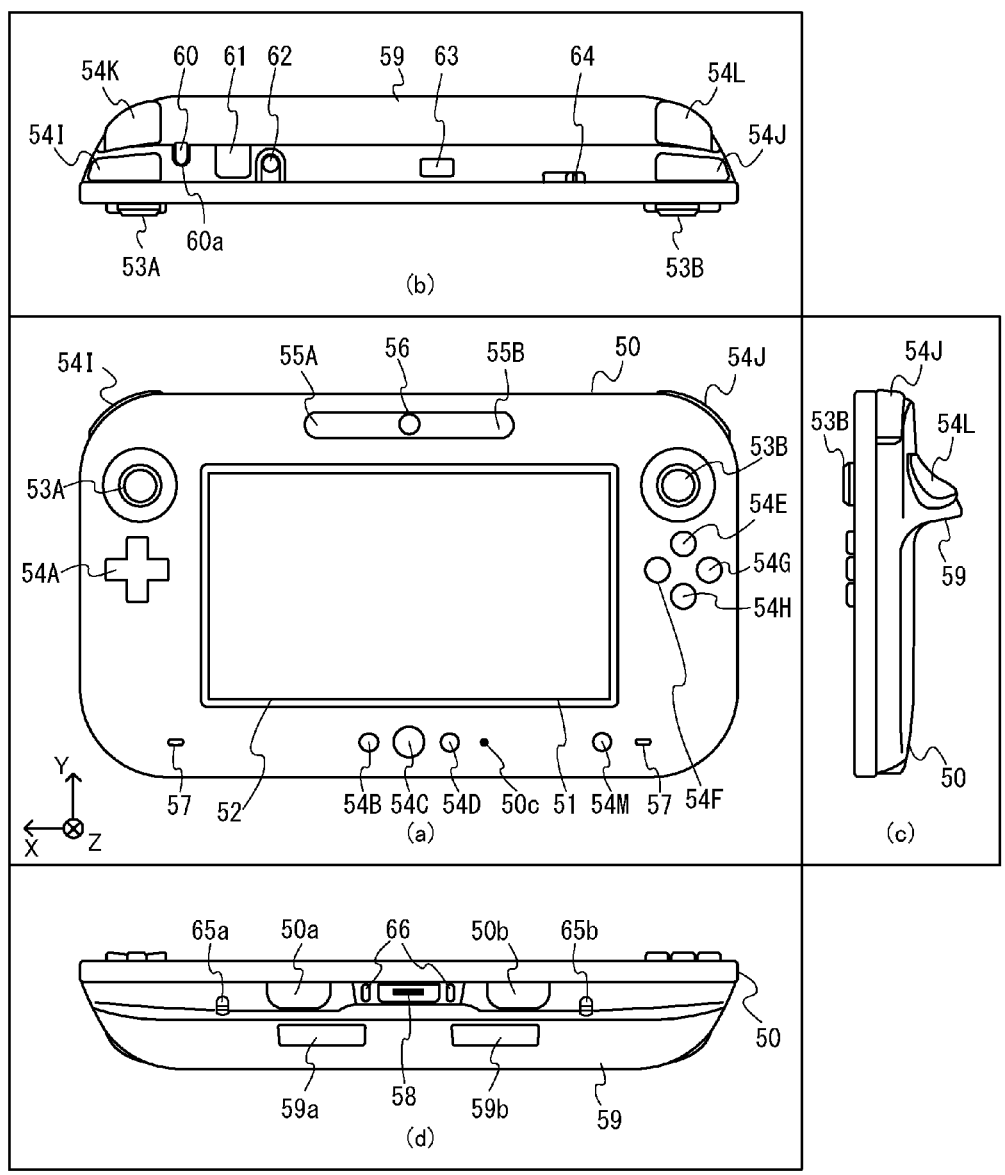
FIG. 5 is a non-limiting example plan view showing an external configuration of a terminal device 7.
Figure 6:
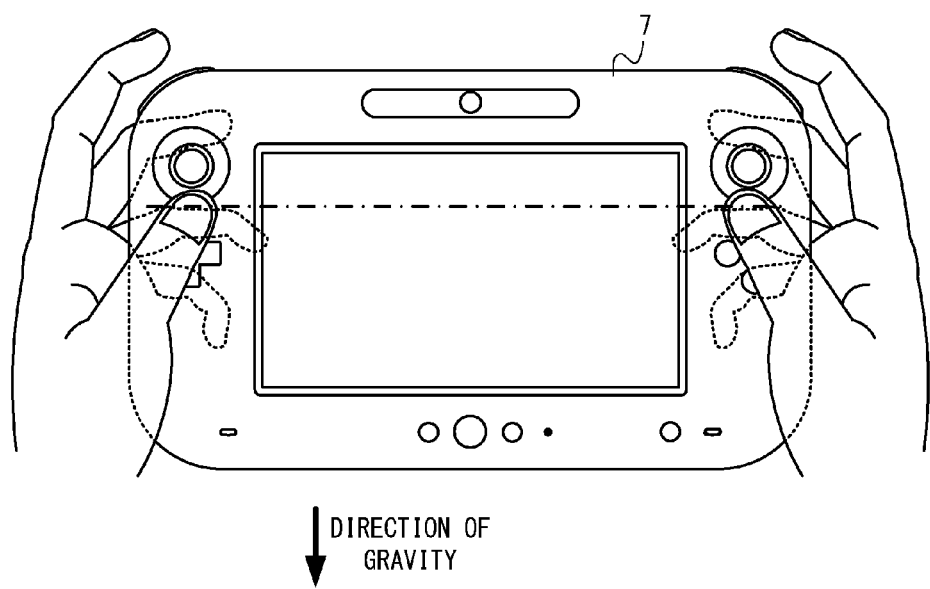
FIG. 6 is a non-limiting example diagram showing a user holding the terminal device 7 in a landscape position.
Figure 7:
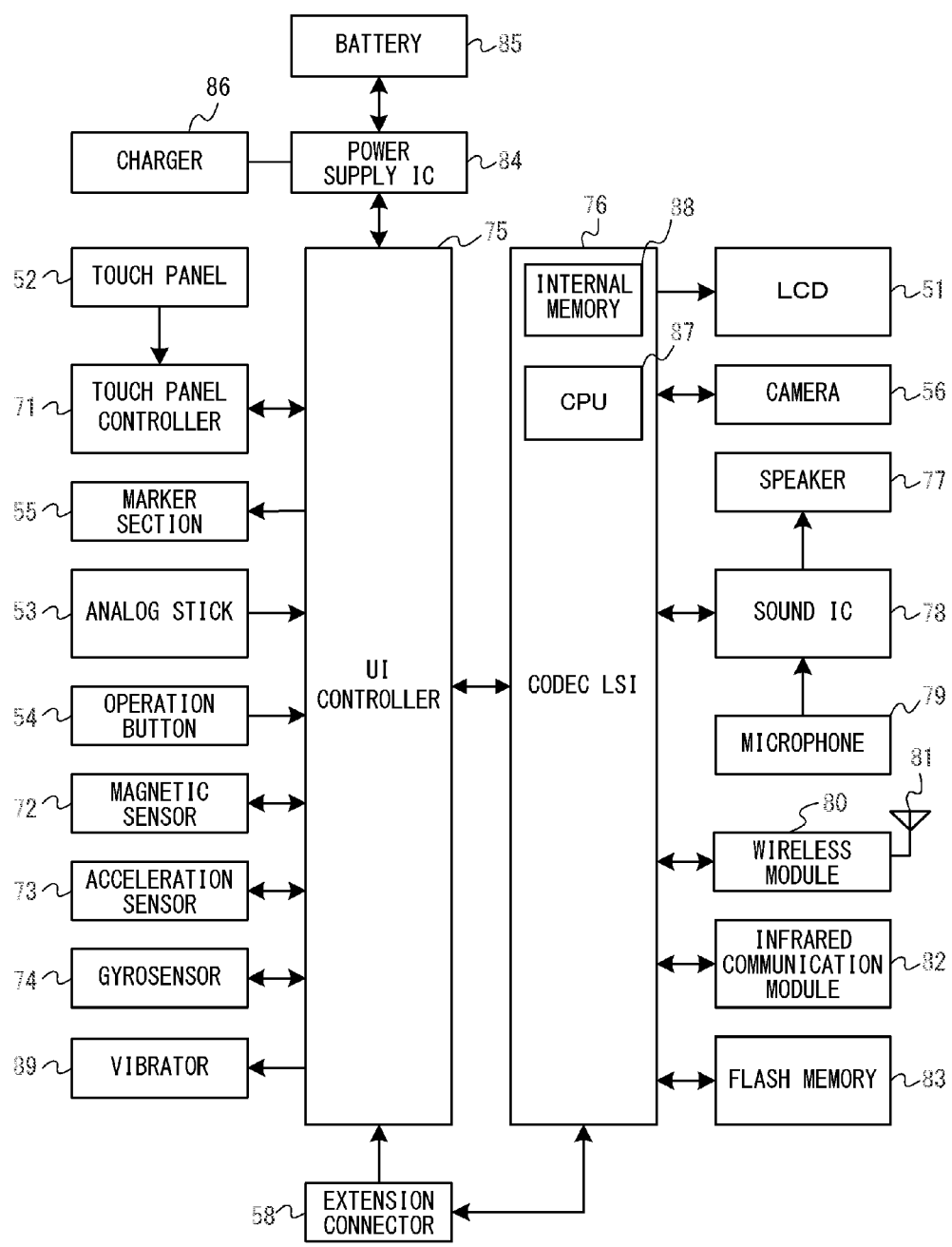
FIG. 7 is a non-limiting example block diagram showing an internal configuration of the terminal device 7.

Next, a configuration of the terminal device 7 will be described with reference to FIGS. 5 to 7. FIG. 5 is a non-limiting example plan view showing an external configuration of the terminal device 7. In FIG. 5, (a) is a front view of the terminal device 7, (b) is a top view thereof, (c) is a right side view thereof, and (d) is a bottom view thereof. FIG. 6 is a non-limiting example diagram showing a user holding the terminal device 7 in a landscape position.

As shown in FIG. 5, the terminal device 7 includes a housing 50 generally in a horizontally-elongated rectangular plate shape. That is, it can also be said that the terminal device 7 is a tablet-type information processing device. The housing 50 is sized to be grasped by the user.

The terminal device 7 includes an LCD 51 on a front surface (front side) of the housing 50. The LCD 51 is provided near the center of the front surface of the housing 50. Therefore, the user can hold and move the terminal device 7 while viewing the screen of the LCD 51, by holding portions of the housing 50 on opposite sides of the LCD 51, as shown in FIG. 6. While FIG. 6 shows an example in which the user holds the terminal device 7 in a landscape position (being wider than it is long) by holding portions of the housing 50 on left and right sides of the LCD 51, the user can also hold the terminal device 7 in a portrait position (being longer than it is wide).

As shown in (a) of FIG. 5, the terminal device 7 includes a touch panel 52 on the screen of the LCD 51 as an operation mechanism. The touch panel 52 may be of a single-touch type or a multi-touch type. While a touch pen 60 is usually used for performing an input operation on the touch panel 52, the present exemplary embodiment is not limited to using the touch pen 60, and an input operation may be performed on the touch panel 52 with a finger of the user. The housing 50 is provided with a hole 60a for accommodating the touch pen 60 used for performing an input operation on the touch panel 52 (see (b) of FIG. 5).

As shown in FIG. 5, the terminal device 7 includes two analog sticks 53A and 53B and a plurality of buttons (keys) 54A to 54M, as operation mechanisms (operation sections). The analog sticks 53A and 53B are each a direction-selection device. The analog sticks 53A and 53B are each configured so that the movable member (stick portion) operated with a finger of the user can be slid in any direction (at any angle in the up, down, left, right and diagonal directions) with respect to the front surface of the housing 50. That is, the analog sticks 53A and 53B are each a direction input device which is also called a slide pad. The movable member of each of the analog sticks 53A and 53B may be of a type that is tilted in any direction with respect to the front surface of the housing 50. Since the present embodiment uses analog sticks of a type that has a movable member which is slidable, the user can operate the analog sticks 53A and 53B without significantly moving the thumbs and therefore while holding the housing 50 more firmly.

The left analog stick 53A is provided on the left side of the screen of the LCD 51, and the right analog stick 53B is provided on the right side of the screen of the LCD 51. As shown in FIG. 6, the analog sticks 53A and 53B are provided at positions that allow the user to operate the analog sticks 53A and 53B while holding the left and right portions of the terminal device 7 (on the left and right sides of the LCD 51), and therefore, the user can easily operate the analog sticks 53A and 53B even when holding and moving the terminal device 7.

The buttons 54A to 54L are operation mechanisms (operation sections) for making predetermined inputs, and are keys that can be pressed down. As will be discussed below, the buttons 54A to 54L are provided at positions that allow the user to operate the buttons 54A to 54L while holding the left and right portions of the terminal device 7 (see FIG. 6).

As shown in (a) of FIG. 5, the cross button (direction-input button) 54A and the buttons 54B to 54H and 54M, of the operation buttons 54A to 54L, are provided on the front surface of the housing 50.

The cross button 54A is provided on the left side of the LCD 51 and under the left analog stick 53A. The cross button 54A has a cross shape, and can be used to select at least up, down, left, and right directions.

The buttons 54B to 54D are provided on the lower side of the LCD 51. The terminal device 7 includes the power button 54M for turning on and off the terminal device 7. The game device 3 can be remotely turned on and off by operating the power button 54M. The four buttons 54E to 54H are provided on the right side of the LCD 51 and under the right analog stick 53B. Moreover, the four buttons 54E to 54H are provided on the upper, lower, left and right sides (of the center position between the four buttons 54E to 54H). Therefore, with the terminal device 7, the four buttons 54E to 54H can also serve as buttons with which the user selects the up, down, left and right directions.

In the present embodiment, a projecting portion (an eaves portion 59) is provided on the back side of the housing 50 (the side opposite to the front surface where the LCD 51 is provided) (see (c) of FIG. 5). As shown in (c) of FIG. 5, the eaves portion 59 is a mountain-shaped member which projects from the back surface of the generally plate-shaped housing 50. The projecting portion has a height (thickness) that allows fingers of the user holding the back surface of the housing 50 to rest thereon.

As shown in (a), (b), and (c) of FIG. 5, a first L button 54I and a first R button 54J are provided in the right and left sides, respectively, on the upper surface of the housing 50. In the present embodiment, the first L button 54I and the first R button 54J are provided on diagonally upper portions (a left upper portion and a right upper portion) of the housing 50.

As shown in (c) of FIG. 5, a second L button 54K and a second R button 54L are provided on the projecting portion (the eaves portion 59). The second L button 54K is provided in the vicinity of the left end of the eaves portion 59. The second R button 54L is provided in the vicinity of the right end of the eaves portion 59.

The buttons 54A to 54L are each assigned a function in accordance with the game program. For example, the cross button 54A and the buttons 54E to 54H may be used for a direction-selection operation, a selection operation, etc., and the buttons 54B to 54E may be used for a decision operation, a cancel operation, etc. The terminal device 7 may include a button for turning on and off the LCD 51, and a button for performing a connection setting (pairing) with the game device 3.

As shown in (a) of FIG. 5, the terminal device 7 includes the marker section 55 including a marker 55A and a marker 55B on the front surface of the housing 50. The marker section 55 is provided on the upper side of the LCD 51. The markers 55A and 55B are each formed by one or more infrared LEDs, as are the markers 6R and 6L of the marker device 6. The infrared LEDs of the markers 55A and 55B are provided behind or further inside than a window portion that is transmissive to infrared light. The marker section 55 is used by the game device 3 to calculate the movement, etc., of the controller 5, as is the marker device 6 described above. The game device 3 can control the lighting of the infrared LEDs of the marker section 55.

The terminal device 7 includes a camera 56 as an image capturing mechanism. The camera 56 includes an image capturing element (e.g., a CCD image sensor, a CMOS image sensor, or the like) having a predetermined resolution, and a lens.

The terminal device 7 includes a microphone 69 as an audio input mechanism. A microphone hole 50c is provided on the front surface of the housing 50. The microphone 69 is provided inside the housing 50 behind the microphone hole 50c. The microphone 69 detects ambient sound of the terminal device 7 such as the voice of the user.

The terminal device 7 includes a speaker 77 as an audio output mechanism. As shown in (a) of FIG. 5, speaker holes 57 are provided in a lower portion of the front surface of the housing 50. The output sound from the speaker 77 is output from the speaker holes 57. In the present embodiment, the terminal device 7 includes two speakers, and the speaker holes 57 are provided at the respective positions of the left and right speakers. The terminal device 7 includes a knob 64 for adjusting the sound volume of the speaker 77. The terminal device 7 includes an audio output terminal 62 for connecting an audio output section such as an earphone thereto.

The housing 50 includes a window 63 through which an infrared signal from an infrared communication module 82 is emitted out from the terminal device 7.

The terminal device 7 includes an extension connector 58 for connecting another device (additional device) to the terminal device 7. The extension connector 58 is a communication terminal for exchanging data (information) with another device connected to the terminal device 7.

In addition to the extension connector 58, the terminal device 7 includes a charging terminal 66 for obtaining power from an additional device. In the present embodiment, the charging terminal 66 is provided on a lower side surface of the housing 50. Therefore, when the terminal device 7 and an additional device are connected to each other, it is possible to supply power from one to the other, in addition to exchanging information therebetween, via the extension connector 58. The terminal device 7 includes a charging connector, and the housing 50 includes a cover portion 61 for protecting the charging connector. Although the charging connector (the cover portion 61) is provided on an upper side surface of the housing 50 in the present embodiment, the charging connector (the cover portion 61) may be provided on a left, right, or lower side surface of the housing 50.

The housing 50 of the terminal device 7 includes holes 65a and 65b through which a strap cord can be tied to the terminal device 7.

With the terminal device 7 shown in FIG. 5, the shape of each operation button, the shape of the housing 50, the number and positions of the components, etc., are merely illustrative, and the present exemplary embodiment can be implemented in other shapes, numbers, and positions.

Next, an internal configuration of the terminal device 7 will be described with reference to FIG. 7. FIG. 7 is a non-limiting example block diagram showing the internal configuration of the terminal device 7. As shown in FIG. 7, the terminal device 7 includes, in addition to the components shown in FIG. 5, a touch panel controller 71, a magnetic sensor 72, the acceleration sensor 73, the gyroscopic sensor 74, a user interface controller (UI controller) 75, a codec LSI 76, the speaker 77, a sound IC 78, the microphone 79, a wireless module 80, an antenna 81, the infrared communication module 82, a flash memory 83, a power supply IC 84, a battery 85, and a vibrator 89. These electronic components are mounted on an electronic circuit board and accommodated in the housing 50.

The UI controller 75 is a circuit for controlling the input/output of data to/from various input/output sections. The UI controller 75 is connected to the touch panel controller 71, an analog stick 53 (the analog sticks 53A and 53B), an operation button 54 (the operation buttons 54A to 54L), the marker section 55, the magnetic sensor 72, the acceleration sensor 73, the gyroscopic sensor 74, and the vibrator 89. The UI controller 75 is connected to the codec LSI 76 and the extension connector 58. The power supply IC 84 is connected to the UI controller 75, and power is supplied to each section via the UI controller 75. The built-in battery 85 is connected to the power supply IC 84 to supply power. The charger 86 or a cable with which power can be obtained from an external power source can be connected to the power supply IC 84 via a charging connector, and the terminal device 7 can receive power supply from or be charged by an external power source using the charger 86 or the cable. The terminal device 7 may be charged by attaching the terminal device 7 to a cradle (not shown) having a charging function.

The touch panel controller 71 is a circuit which is connected to the touch panel 52 and controls the touch panel 52. The touch panel controller 71 generates touch position data in a predetermined format based on a signal from the touch panel 52, and outputs the data to the UI controller 75. The touch position data represents, for example, the coordinates of a position on the input surface of the touch panel 52 at which an input operation is performed.

The analog stick 53 outputs, to the UI controller 75, stick data representing a direction and an amount in which the stick portion operated with a finger of the user has been slid (or tilted). The operation button 54 outputs, to the UI controller 75, operation button data representing the input state of each of the operation buttons 54A to 54L (e.g., whether the button is pressed).

The magnetic sensor 72 detects an azimuth by sensing the magnitude and direction of the magnetic field. Azimuth data representing the detected azimuth is output to the UI controller 75. The UI controller 75 outputs a control instruction for the magnetic sensor 72 to the magnetic sensor 72. While there are sensors using a magnetic impedance (MI) element, a fluxgate sensor, a Hall element, a giant magneto-resistive (GMR) element, a tunnel magneto-resistance (TMR) element, an anisotropic magneto-resistive (AMR) element, etc., the magnetic sensor 72 may be any sensor as long as the sensor can detect the azimuth. Strictly speaking, in a place where there is a magnetic field other than the geomagnetic field, the obtained azimuth data does not represent the azimuth. Nevertheless, if the terminal device 7 moves, the azimuth data changes, and it is therefore possible to calculate a change in the attitude of the terminal device 7.

The acceleration sensor 73 is provided inside the housing 50 and detects the magnitude of a linear acceleration along each of the directions of the three axes (the X-, Y-, and Z-axes shown in (a) of FIG. 5). Specifically, the acceleration sensor 73 detects the magnitude of the linear acceleration along each of the axes, where the X-axis lies in a longitudinal direction of the housing 50, the Y-axis lies in a width direction of the housing 50, and the Z-axis lies in a direction vertical to the surface of the housing 50. Acceleration data representing the detected acceleration is output to the UI controller 75. The UI controller 75 outputs a control instruction for the acceleration sensor 73 to the acceleration sensor 73. While the acceleration sensor 73 is assumed to be a capacitive-type MEMS-type acceleration sensor, for example, in the present embodiment, other types of acceleration sensors may be employed in other embodiments. The acceleration sensor 73 may be an acceleration sensor which detects an acceleration or accelerations in one or two axial detections.

The gyroscopic sensor 74 is provided inside the housing 50 and detects angular velocities about the three axes, i.e., the X-, Y-, and Z-axes. Angular velocity data representing the detected angular velocities is output to the UI controller 75. The UI controller 75 outputs a control instruction for the gyroscopic sensor 74 to the gyroscopic sensor 74. The number and combination of gyroscopic sensors used for detecting angular velocities about the three axes may be any number and combination, and the gyroscopic sensor 74 may be formed by a 2-axis gyroscopic sensor and a 1-axis gyroscopic sensor, as is the gyroscopic sensor 48. The gyroscopic sensor 74 may be a gyroscopic sensor which detects an acceleration or accelerations in one or two axial detections.

The UI controller 75 outputs, to the codec LSI 76, operation data including touch position data, stick data, operation button data, azimuth data, acceleration data, and angular velocity data received from the components described above. If another device is connected to the terminal device 7 via the extension connector 58, data representing an operation performed on the other device may be further included in the operation data.

The codec LSI 76 is a circuit for performing a compression process on data to be transmitted to the game device 3, and a decompression process on data transmitted from the game device 3. The LCD 51, the camera 56, the sound IC 78, the wireless module 80, the flash memory 83, and the infrared communication module 82 are connected to the codec LSI 76. The codec LSI 76 includes a CPU 87 and an internal memory 88. While the terminal device 7 does not perform a game process itself, the terminal device 7 executes programs for management and communication thereof. When the terminal device 7 is turned on, a program stored in the flash memory 83 is read out to the internal memory 88 and executed by the CPU 87, whereby the terminal device 7 is started up. Some area of the internal memory 88 is used as a VRAM for the LCD 51.

The camera 56 captures an image and outputs the captured image data to the codec LSI 76 in accordance with an instruction from the game device 3. A control instruction for the camera 56, such as an image capturing instruction, is output from the codec LSI 76 to the camera 56.

The sound IC 78 is a circuit which is connected to the speaker 77 and the microphone 79 and controls input/output of audio data to/from the speaker 77 and the microphone 79. That is, when audio data is received from the codec LSI 76, the sound IC 78 outputs an audio signal obtained by performing D/A conversion on the audio data to the speaker 77, which in turn outputs sound. The microphone 79 detects sound entering the terminal device 7 (the voice of the user, etc.), and outputs an audio signal representing the sound to the sound IC 78. The sound IC 78 performs A/D conversion on the audio signal from the microphone 79, and outputs audio data in a predetermined format to the codec LSI 76.

The codec LSI 76 transmits image data from the camera 56, audio data from the microphone 79, and operation data (terminal operation data) from the UI controller 75 to the game device 3 via the wireless module 80. In the present embodiment, the codec LSI 76 performs a compression process similar to that of the codec LSI 27 on image data and audio data. The terminal operation data and the compressed image data and audio data are output, as transmit data, to the wireless module 80. The antenna 81 is connected to the wireless module 80. The wireless module 80 transmits the transmit data to the game device 3 via the antenna 81. The wireless module 80 has a function similar to that of the terminal communication module 28 of the game device 3. That is, the wireless module 80 has a function of connecting to a wireless LAN by a scheme in conformity with the IEEE 802.11n standard, for example. The transmitted data may or may not be encrypted as necessary.

As described above, the transmit data transmitted from the terminal device 7 to the game device 3 includes operation data (terminal operation data), image data, and audio data. When another device is connected to the terminal device 7 via the extension connector 58, data received from the other device may also be contained in the transmit data. The infrared communication module 82 establishes infrared communication in conformity with the IRDA standard, for example, with another device. The codec LSI 76 may transmit, to the game device 3, data received via infrared communication while the data is contained in the transmit data as necessary.

As described above, compressed image data and audio data are transmitted from the game device 3 to the terminal device 7. These pieces of data are received by the codec LSI 76 via the antenna 81 and the wireless module 80. The codec LSI 76 decompresses the received image data and audio data. The decompressed image data is output to the LCD 51, which in turn displays an image on the LCD 51. That is, the codec LSI 76 (the CPU 87) displays the received image data on the display section. The decompressed audio data is output to the sound IC 78, which in turn causes the speaker 77 to emit sound.

[5. General Description of Game Process]

Next, a game process executed in the game system 1 of the present embodiment will be generally described. A game in the present embodiment is played by a plurality of players. In the present embodiment, one terminal device 7 and a plurality of controllers 5 are connected to the game device 3 via wireless communication. In the game of the present embodiment, the maximum number of controllers 5 which are allowed to connect to the game device 3 is three.

In the description that follows, the game of the present embodiment is assumed to be played by four players which are three first players (first players A-C) who operates the controllers 5 (controllers 5a-5c) and one second player who operates the terminal device 7.

Figure 8:
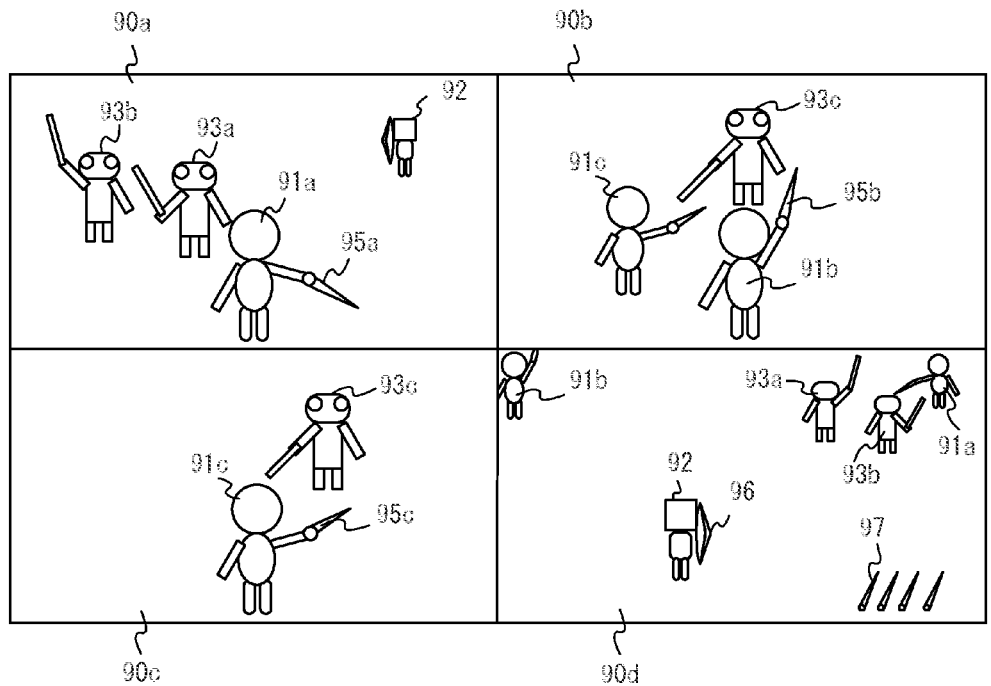
FIG. 8 is a non-limiting example diagram showing an example television game image displayed on a television 2.
Figure 9:
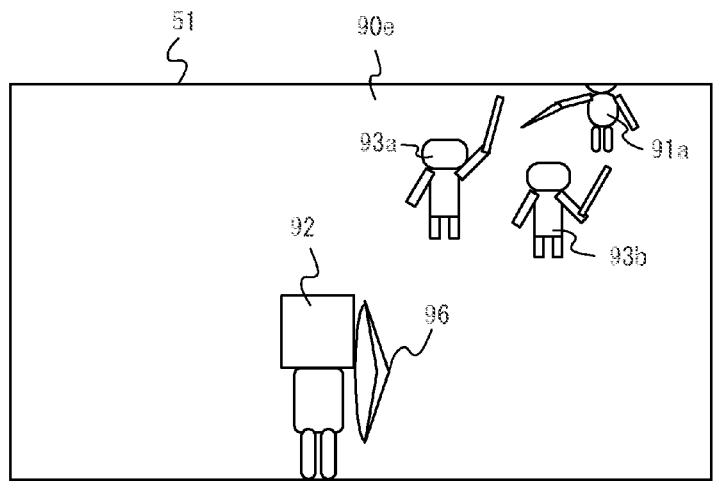
FIG. 9 is a non-limiting example diagram showing an example terminal game image displayed on an LCD 51 of the terminal device 7.

FIG. 8 is a non-limiting example diagram showing an example television game image displayed on the television 2. FIG. 9 is a non-limiting example diagram showing an example terminal game image displayed on the LCD 51 of the terminal device 7.

As shown in FIG. 8, the screen of the television 2 is divided in four equal regions, in which images 90a, 90b, 90c, and 90d are displayed. As shown in FIG. 8, the television 2 displays first characters 91a, 91b, and 91c, and a second character 92. A plurality of enemy characters (93a-93c) are also displayed on the television 2.

The first character 91a is a virtual character which is provided in a game space (a three-dimensional (or two-dimensional) virtual world) and is operated by the first player A. The first character 91a holds a sword object 95a and attacks the enemy character 93 using the sword object 95a. The first character 91b is a virtual character which is provided in the game space and is operated by the first player B. The first character 91b holds a sword object 95b and attacks the enemy character 93 using the sword object 95b. The first character 91c is a virtual character which is provided in the game space and is operated by the first player C. The first character 91c holds a sword object 95c and attacks the enemy character 93 using the sword object 95c. The second character 92 is a virtual character which is provided in the game space and is operated by the second player. The second character 92 holds a bow object 96 and an arrow object 97 and attacks the enemy character 93 by shooting the arrow object 97 in the game space. The enemy character 93 is a virtual character which is controlled by the game device 3.

In the game of the present embodiment, the first players A-C and the second player move in the game space while cooperating with each other to kill or beat the enemy character 93. Specifically, the player characters (91a-91c and 92) move from a game start position to a game end position in the game space while killing or beating the enemy character 93.

As shown in FIG. 8, the television 2 displays the images 90a-90d in the four equal regions (upper left, lower left, upper right, and lower right regions) into which the screen is divided. Specifically, the upper left region of the screen shows the image 90a which is an image of the game space as viewed from directly behind the first character 91a which is operated by the first player A using the controller 5a. The image 90a of the game space is captured by a first virtual camera A which is set based on a position and an operation in the game space of the first character 91a. A shooting direction of the first virtual camera A is the same as the orientation in the game space of the first character 91a. The upper right region of the screen shows the image 90b which is an image of the game space as viewed from directly behind the first character 91b which is operated by the first player B using the controller 5b. The image 90b of the game space is captured by a first virtual camera B which is set based on a position and an orientation in the game space of the first character 91b. A shooting direction of the first virtual camera B is the same as the orientation in the game space of the first character 91b. The lower left region of the screen shows the image 90c which is an image of the game space as viewed from directly behind the first character 91c which is operated by the first player C using the controller 5c. The image 90c of the game space is captured by a first virtual camera C which is set based on a position and an orientation in the game space of the first character 91c. A shooting direction of the first virtual camera C is the same as the orientation in the game space of the first character 91c. The lower right region of the screen shows the image 90d which is an image of the game space as viewed from diagonally behind the second character 92 which is operated by the second player using the terminal device 7. The image 90d of the game space is captured by a second virtual camera which is set based on a position and an orientation in the game space of the second character 92. The second virtual camera is located at a predetermined position at the right rear of the second character 92 (above the vicinity of the ground of the game space). Therefore, the image 90d captured by the second virtual camera is an image of the game space containing the second character 92 as viewed from diagonally behind the second character and above.

In the present embodiment, the first virtual camera A is set directly behind the first character 91a, and therefore, the first character 91a is translucent in the image 90a. As a result, the player can visually recognize a character(s) which is located deeper in the depth direction of the screen than the first character 91a in the image 90a. This holds true for the other images 90b and 90d, etc. The positions of the first virtual cameras A-C may be set at the viewpoints of the first characters 91a-91c.

On the other hand, as shown in FIG. 9, the LCD 51 of the terminal device 7 displays an image 90e of the game space as viewed from the rear of the second character 92. The image 90e is an image of the game space captured by a third virtual camera which is set based on a position and an orientation in the game space of the second character 92. The third virtual camera is located behind the second character 92 (here, also offset slightly rightwardly from the center line in the front-rear direction of the second character 92). An attitude (shooting direction) of the third virtual camera is set based on the orientation in the game space of the second character 92. As described below, the orientation of the second character 92 is changed based on an input operation performed on the left analog stick 53A and the attitude of the terminal device 7. Therefore, the attitude of the third virtual camera is changed based on the input operation performed on the left analog stick 53A and the attitude of the terminal device 7.

A position in the game space is represented by coordinate values along the axes of a rectangular coordinate system (xyz coordinate system) which is fixed to the game space. The y-axis extends upward along a direction perpendicular to the ground of the game space, and the x- and z-axes extend in parallel to the ground of the game space. The first characters 91a-91c and the second character 92 move on the ground of the game space (xz-plane) while changing the orientation (direction parallel to the xz-plane). The first character 91 automatically moves under a predetermined rule. The second character 92 moves on the ground of the game space while changing the orientation in accordance with an operation performed on the terminal device 7. A control for the position and orientation of the second character 92 will be described below.

Figure 10:
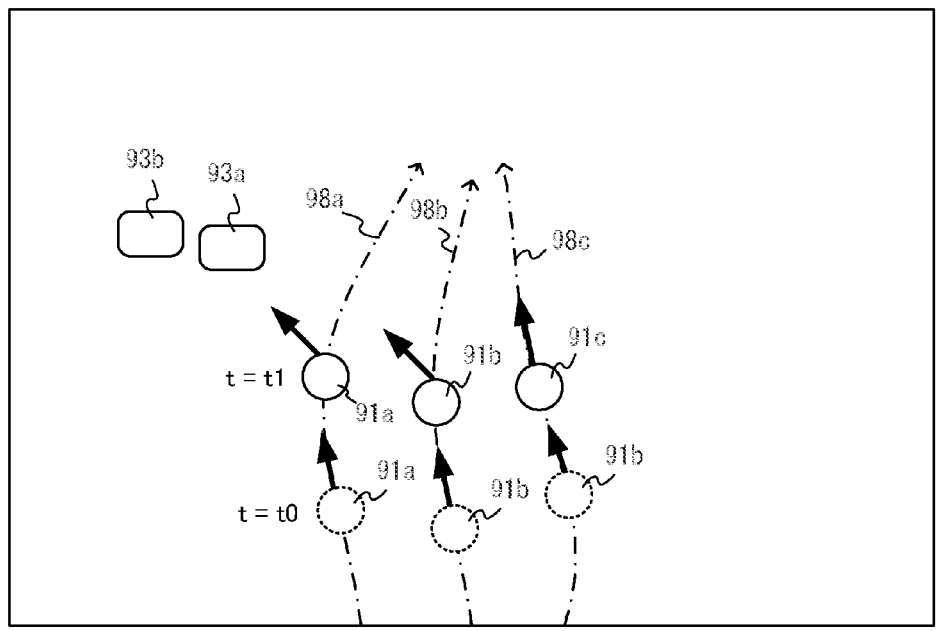
FIG. 10 is a non-limiting example diagram showing movement paths of first characters 91a-91c.

Next, the movement (changes in the orientation and position) of the first character 91 will be described. The first character 91 automatically moves on a path which is previously set in the game space. FIG. 10 is a non-limiting example diagram showing movement paths of the first characters 91a-91c. FIG. 10 simply shows the game space as viewed from above. As shown in FIG. 10, the first characters 91a-91c and the enemy characters 93a and 93b are present in the game space. It is assumed that there is the game start position in a lower portion of FIG. 10 and there is the game end position in an upper portion of FIG. 10. As shown in FIG. 10, paths 98a, 98b, and 98c indicated by dash-dot lines are previously set in the game space. The paths 98a-98c are movement paths of the characters which are not actually displayed on the screen and are internally set in the game device 3.

Specifically, the first character 91a normally automatically moves on the path 98a. The first character 91b normally automatically moves on the path 98b. The first character 91c normally automatically moves on the path 98c. Here, if an enemy character 93 is located within a predetermined range (distance) from the first character 91, the first character 91 leaves the path 98 and approaches or moves toward the enemy character 93 which is present within the predetermined range. For example, as shown in FIG. 10, if a distance between the first character 91a and the enemy character 93a is greater than a predetermined value, the orientation of the first character 91a is set to a direction along the path 98a, and the position of the first character 91a changes with time so that the first character 91a is positioned on the path 98a (time t=t0). In other words, if the distance between the first character 91a and the enemy character 93a is greater than the predetermined value, the first character 91a moves on the path 98a while changing the orientation. If a predetermined period of time has elapsed since time t=t0, i.e., time t=t1, the distance between the first character 91a and the enemy character 93a (and 93b) is smaller than or equal to the predetermined value. In this case, the first character 91a begins to move toward the enemy character 93a. That is, the orientation of the first character 91a is changed to a direction from the position of the first character 91a to the position of the enemy character 93a, and the first character 91a moves toward the enemy character 93a. Similarly, since the distance between the first character 91b and the enemy character 93a is smaller than or equal to the predetermined value, the first character 91b also begins to move toward the enemy character 93a. On the other hand, since the distance between the first character 91c and the enemy character 93a is greater than the predetermined value, the first character 91c does not move toward the enemy character 93a and moves on the path 98c.

Figure 11:
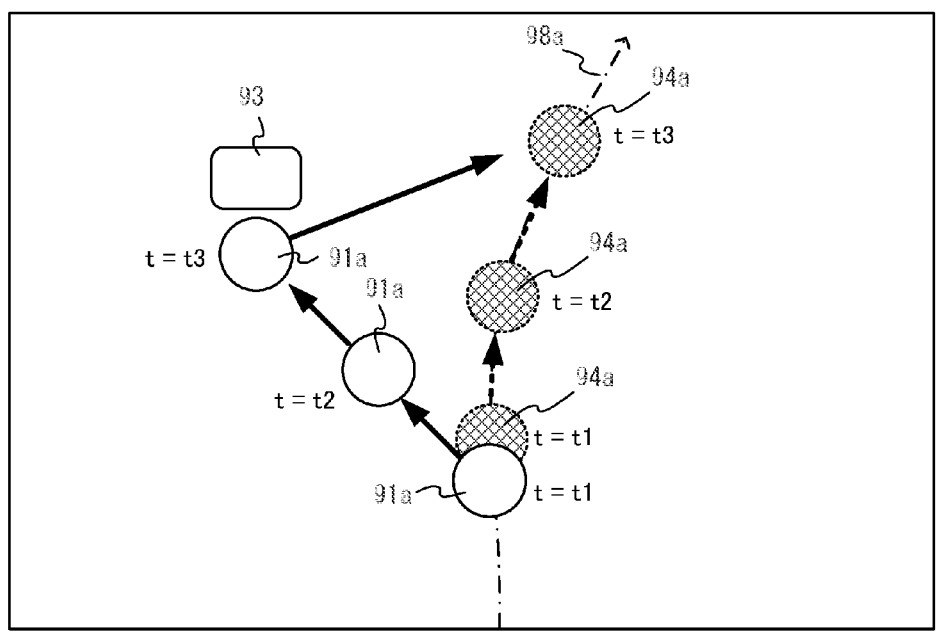

FIG. 11 is a non-limiting example diagram showing details of the movement of the first character 91a. As shown in FIG. 11, a guide object 94a which moves on the path 98a is provided in the game space. A guide object 94 is provided for each first character 91, and is internally set in the game device 3. The guide object 94 is not actually displayed on the screen. The guide object 94a is used to control the movement of the first character 91a, and automatically moves on the path 98a. If no enemy characters 93 are present around the first character 91a, the first character 91a moves, following the guide object 94a. Specifically, the orientation of the first character 91a is set to a direction from the position of the first character 91a toward the position of the guide object 94a, and the position of the first character 91a is changed to be closer to the position of the guide object 94a. On the other hand, if an enemy character 93 is present around the first character 91a, the first character 91a approaches or moves toward the enemy character 93. In other words, if an enemy character 93 is present around the first character 91a, the first character 91a moves toward the enemy character 93. If the enemy character 93 is killed or beaten, so that no enemy characters 93 are present around the first character 91a, the first character 91a moves again, following the guide object 94a. Specifically, as shown in FIG. 11, at time t=t1, the guide object 94a is present on the path 98a, and the first character 91a is also located on the path 98a. Here, at time t=t1, if the distance between the first character 91a and an enemy character 93 is smaller than or equal to the predetermined value, the first character 91a begins to move toward the enemy character 93. If a predetermined period of time has elapsed since time t=t1, i.e., time t=t2, the first character 91a leaves the path 98a. Thereafter, if another predetermined period of time has elapsed, the first character 91a moves to a position in the vicinity of the enemy character 93, the first character 91a fights with the enemy character 93. During this fighting, the guide object 94a moves on the path 98a while the distance between the first character 91a and the guide object 94a is prevented from being greater than or equal to a predetermined value. If the fighting between the first character 91a and the enemy character 93 has continued for a long period of time, the guide object 94a stops. If the first character 91a kills or beats the enemy character 93 at time t=t3, so that there are no enemy characters 93 around the first character 91a, the first character 91a resumes moving, following the guide object 94a (toward the guide object 94a).

Thus, each first character 91 normally automatically moves in the game space, following the corresponding guide object 94, and when an enemy character 93 is present within the predetermined range, moves toward the enemy character 93.

Figure 12:
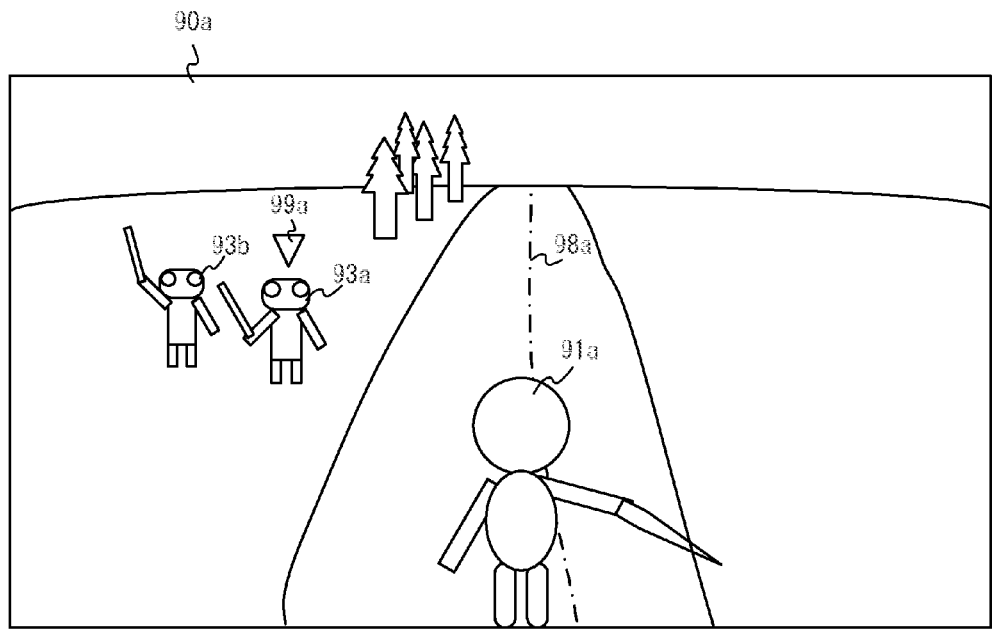
FIG. 12 is a non-limiting example diagram showing an image 90a which is displayed in an upper left region of the television 2 when the first character 91a begins to move toward a plurality of enemy characters 93.

FIG. 12 is a non-limiting example diagram showing the image 90a which is displayed in the upper left region of the television 2 when the first character 91a begins to move toward a plurality of enemy characters 93. As shown in FIG. 12, when the distance between the first character 91a and an enemy character 93 is smaller than or equal to the predetermined value, then if a plurality of enemy characters 93 are present, the image 90a shows a selection object 99a. The selection object 99a is displayed above the head of an enemy character 93a which is to be attacked by the first character 91a. In other words, the selection object 99a indicates a target to be attacked by the first character 91a. The first character 91a automatically approaches or moves toward the enemy character 93a selected by the selection object 99a (without the first player A specifying a direction). When the first player A operates the cross button 32a of the controller 5, the position of the selection object 99a is changed so that the selection object 99a is displayed above the head of another enemy character 93b. As a result, the first player A switches the attack target from one enemy character 93 to another.

As shown in FIG. 10, if the distance between the first character 91b and the enemy character 93 is smaller than or equal to the predetermined value, the first character 91b also moves toward the enemy character 93. Although not shown, similar to FIG. 12, the image 90b displayed in the upper right region of the television 2 shows a selection object 99b in addition to the first character 91b and the enemy characters 93a and 93b. In this case, the image 90a also shows the selection object 99b indicating a target to be attacked by the first character 91b. The selection object 99b is displayed in a display form different from that of the selection object 99a. For example, if the first character 91a is displayed in red color, the selection object 99a is displayed in red color, and if the first character 91b is displayed in blue color, the selection object 99b is displayed in blue color. As a result, by viewing the image 90a, the first player A can recognize the attack target of the first character 91a operated by himself or herself and the attack target of the first character 91b operated by the first player B. That is, by viewing the images 90a-90c, each player operating the controller 5 can simultaneously recognize which of the enemy characters 93 is a target to be attacked by himself or herself and which of the enemy characters 93 is a target to be attacked by other players.

The first character 91 and the second character 92 attack the enemy character 93 as follows. That is, the first character 91a attacks the enemy character 93 using the sword object 95a. When the first player A swings the controller 5a, the first character 91a performs a motion of swinging the sword object 95a. Specifically, the attitude in the game space of the sword object 95a is changed, corresponding to a change in the attitude in the real space of the controller 5a. For example, when the first player A swings the controller 5a from left to right, the first character 91a performs a motion of swinging the sword object 95a from left to right. When the sword object 95a is swung, then if an enemy character 93 is present within a short distance (a distance corresponding to the length of the sword object 95a) in front of the first character 91a, the sword object 95a hits the enemy character 93, i.e., an attack is successful. If a predetermined number of attacks on the enemy character 93 are successful, the enemy character 93 is killed or beaten. Similarly, the first characters 91b and 91c attack the enemy character 93 using the sword objects 95b and 95c, respectively.

On the other hand, the second character 92 shoots the arrow object 97 in the game space to attack the enemy character 93. For example, when the second player slides the right analog stick 53B of the terminal device 7 in a predetermined direction (e.g., the down direction) using his or her finger, a circular sight is displayed on the LCD 51 of the terminal device 7. In this case, when the second player releases the right analog stick 53B, the right analog stick 53B returns to the original position (the right analog stick 53B returns to the center position). As a result, the arrow object 97 is shot in the game space from the position of the second character 92 toward the center of the circular sight displayed on the LCD 51. Thus, the second character 92 can attack the enemy character 93 at a long distance from the second character 92 by shooting the arrow object 97. As shown in FIG. 8, the number of remaining arrow objects 97 is displayed on the television 2 (in FIG. 8, the number of remaining arrow object 97 is four). When the second player performs a predetermined operation on the terminal device 7 (e.g., the back surface of the terminal device 7 is caused to face in a direction toward the ground), an arrow object 97 is reloaded, and the number of remaining arrow objects 97 becomes a predetermined value.

The enemy character 93 attacks player characters (the first character 91 and the second character 92). If one of the player characters (here, four characters) is killed or beaten by a predetermined number of attacks from the enemy character 93, the game is over. Therefore, the players enjoy playing the game by cooperating with each other to kill or beat the enemy character 93 so that none of the players is killed or beaten by the enemy character 93.

Figure 13:
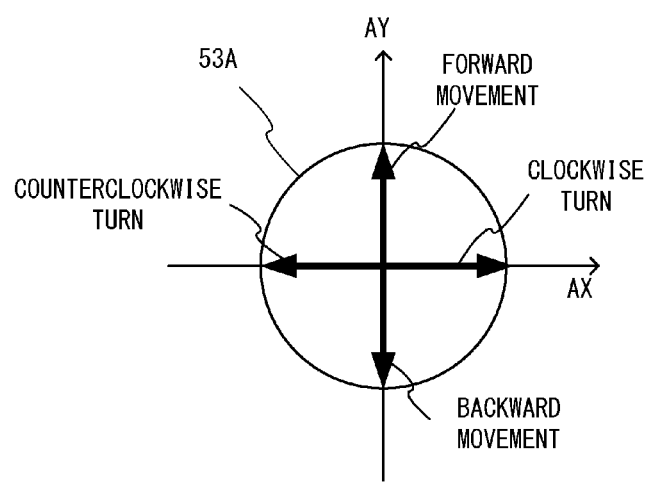
FIG. 13 is a non-limiting example diagram showing a movement and a rotation of a second character 92 based on a direction which is selected using a left analog stick 53A.

Next, a control of the position and orientation of the second character 92 will be described. The second character 92 moves based on an input operation performed on the left analog stick 53A of the terminal device 7. FIG. 13 is a non-limiting example diagram showing a movement and a rotation of the second character 92 based on an input direction of the left analog stick 53A. In FIG. 13, an AY-axis direction indicates the up direction of the left analog stick 53A (the Y-axis direction in (a) of FIG. 5), and an AX-axis direction indicates the right direction of the left analog stick 53A (the X-axis negative direction in (a) of FIG. 5). Specifically, when the left analog stick 53A is slid in the up direction, the second character 92 moves forward (i.e., moves in a depth direction away from the player of the screen of FIG. 9). When the left analog stick 53A is slid in the down direction, the second character 92 retreats or moves backward without changing the orientation (i.e., moves in a depth direction toward the player of the screen of FIG. 9 while facing in the depth direction away from the player). Thus, when the up direction is input using the left analog stick 53A, the second character 92 moves forward, and when the down direction is input using the left analog stick 53A, the second character 92 retreats or moves backward.

The orientation of the second character 92 is changed based on a first input operation and a second input operation. The first input operation is performed on the left analog stick 53A. Specifically, as shown in FIG. 13, when the left analog stick 53A is slid in the right direction, the second character 92 turns clockwise. That is, when the left analog stick 53A is slid in the right direction, the second character 92 rotates clockwise as viewed from above in the game space (in this case, only the orientation of the second character 92 is changed, and the position of the second character 92 is not changed). When the left analog stick 53A is slid in the left direction, the second character 92 turns counterclockwise. When the left analog stick 53A is slid in a diagonal direction, the second character 92 moves while turning clockwise or counterclockwise. For example, when the left analog stick 53A is slid diagonally upward and to the right (in an upper right direction), the second character 92 moves forward while turning clockwise.

Figure 14:
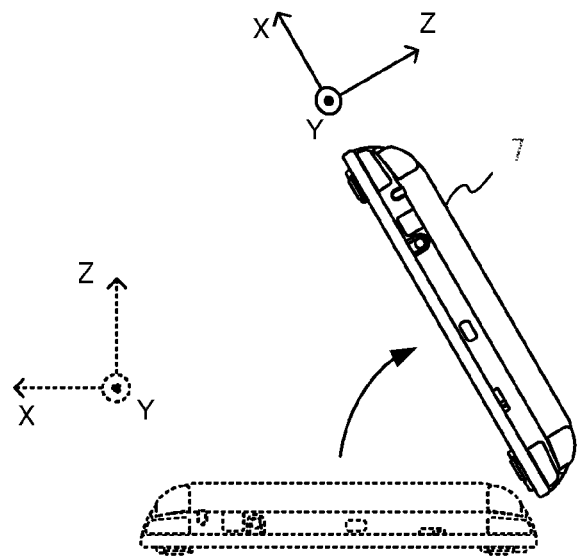
FIG. 14 is a non-limiting example diagram showing the terminal device 7 as viewed from above in a real space, indicating a change in an attitude in the real space of the terminal device 7.

The second input operation is performed by changing the attitude in the real space of the terminal device 7. That is, the orientation of the second character 92 is changed based on a change in the attitude of the terminal device 7. FIG. 14 is a non-limiting example diagram showing the terminal device 7 as viewed from above in the real space, indicating a change in the attitude in the real space of the terminal device 7. As shown in FIG. 14, when the terminal device 7 is rotated about the Y-axis (rotated about the axis of the gravity direction from the attitude of FIG. 6), the orientation in the game space of the second character 92 is changed based on the amount of the rotation. For example, when the terminal device 7 is rotated clockwise by a predetermined angle as viewed from above in the real space, the second character 92 is also rotated clockwise by the predetermined angle as viewed from above in the game space. For example, when the second player causes the back surface of the terminal device (a surface opposite to the surface on which the LCD 51 is provided) to face in a right direction, the second character 92 faces in a right direction. For example, when the back surface of the terminal device 7 is caused to face in an up direction (the terminal device 7 is rotated about the X-axis), the orientation of the second character 92 is not changed. In other words, the orientation of the second character 92 is set to be parallel to the ground (xz-plane) of the game space, and therefore, even when the back surface of the terminal device 7 is caused to face in an up direction, the second character 92 does not face in an up direction in the game space. In another embodiment, the orientation of the second character 92 may be changed along an up-down direction (a direction parallel to the y-axis) in the game space.

Thus, the second character 92 is caused to move based on the up and down directions input using the left analog stick 53A (a sliding operation in the up and down directions). The orientation of the second character is changed based on the left and right directions input using the left analog stick 53A and a change in the attitude of the terminal device 7.

The attitudes of the second and third virtual cameras are changed based on a change in the orientation of the second character 92. Specifically, the shooting direction vector of the second virtual camera is set to have a fixed angle with respect to the orientation (front direction vector) of the second character 92. As a result, the television 2 displays the image 90d which is an image of the game space containing the second character 92 which is captured from a position at the right rear of and above the second character 92. The orientation in the xz-plane of the shooting direction vector of the third virtual camera (the orientation of a vector obtained by projecting the shooting direction vector onto the xz-plane of the game space) is set to be the same as the orientation of the second character 92. The orientation in the up-down direction (direction parallel to the y-axis) of the shooting direction vector of the third virtual camera is set based on the attitude of the terminal device 7. For example, when the back surface of the terminal device 7 is caused to face upward in the real space, the shooting direction vector of the third virtual camera is also set to face upward in the game space. Therefore, when the second player rotates the terminal device 7 clockwise as shown in FIG. 14, the third virtual camera is also rotated clockwise, so that an image of a right portion of the game space before the rotation is displayed on the LCD 51 of the terminal device 7. When the second player causes the back surface of the terminal device 7 to face upward in the real space, an image of an upper region of the game space is displayed on the LCD 51 of the terminal device 7.

Figure 15:
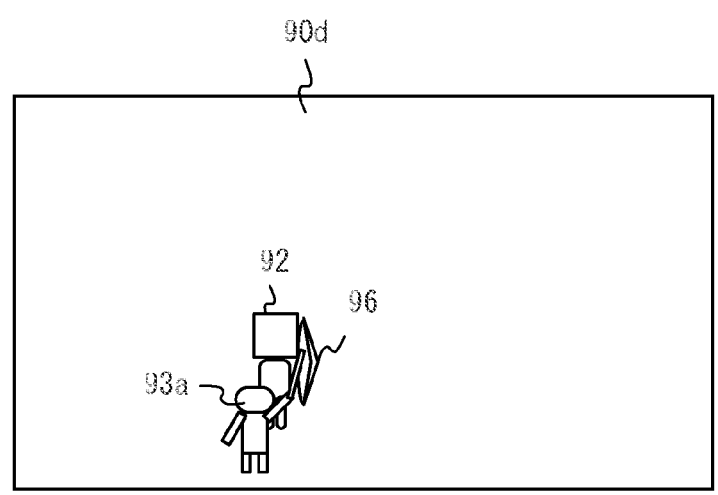
FIG. 15 is a non-limiting example diagram showing an image 90d displayed in a lower right region of the television 2 when the enemy character 93 is present directly behind the second character 92.

Here, as shown in FIG. 15, when the enemy character 93 is present directly behind the second character 92, the second player tries to cause the second character 92 to turn to face in the opposite direction from the original in order to attack the enemy character 93. FIG. 15 is a non-limiting example diagram showing the image 90d displayed in the lower right region of the television 2 when the enemy character 93 is present directly behind the second character 92. In order to cause the second character 92 to turn to face in the opposite direction from the original, the second player operates the left analog stick 53A of the terminal device 7 while viewing the screen of the television 2 or the screen of the terminal device 7. In this case, the enemy character 93 is displayed below the second character 92 on the screen of the television 2, and therefore, the second player slides the left analog stick 53A in the down direction. As described above, when an input operation performed on the left analog stick 53A is the down direction, the second character 92 retreats or moves backward (the position of the second character 92 moves backward while the orientation of the second character 92 is not changed). Alternatively, when the second player causes the second character 92 to turn to face in the opposite direction from the original, the terminal device 7 is rotated to a large extent (about the Y-axis). Thus, when the second character 92 is caused to turn to face in the opposite direction from the original, the difficulty of the operation may increase.

Therefore, in the present embodiment, when the enemy character 93 is present behind the second character 92, the following two processes (a first and a second process) are performed in order to more easily cause the second character 92 to face the enemy character 93. That is, in the first process, if the enemy character 93 is present behind the second character 92, then when the down direction is input using the left analog stick 53A, the second character 92 is caused to turn. Specifically, a back direction degree BR of the enemy character 93 with respect to the second character 92 is calculated, and based on the back direction degree BR, the second character 92 is caused to turn. Here, the term "back direction degree BR" refers to a value which indicates to what degree the enemy character 93 is present behind the second character 92 (how much the enemy character 93 is closer to a position directly behind the second character 92), and changes depending on an angle determined by the second character 92 and the enemy character 93. Specifically, the back direction degree BR increases as the enemy character 93 is closer to a position directly behind the second character 92. For example, when the enemy character 93 is located directly behind the second character 92 (the enemy character 93 is located in a direction of 180 degrees, where the front direction of the second character 92 is zero degrees), the back direction degree BR is one. When the enemy character 93 is located to the right or left of the second character 92 (the enemy character 93 is located in a direction of 90 or −90 degrees, where the front direction of the second character 92 is zero degrees), the back direction degree BR is zero. When the enemy character 93 is located in a direction of 90 to 180 degrees (−90 to −180 degrees), the back direction degree BR ranges from zero to one. Although details will be described below, the amount of turn (the amount of rotation) of the second character 92 increases with an increase in the back direction degree BR.

In the second process, when the enemy character 93 is present behind the second character 92, then if the terminal device 7 is rotated in a direction which causes the second character 92 to turn toward the enemy character 93, the second character 92 is rotated by a larger rotation amount than the actual rotation amount of the terminal device 7. For example, when the enemy character 93 is located directly behind the second character 92, the second character 92 may be rotated by a rotation amount which is 1.5 times as large as the rotation amount about the Y-axis of the terminal device 7. For example, when the enemy character 93 is present directly behind the second character 92, then if the terminal device 7 is rotated clockwise by an angle (e.g., 120 degrees) smaller than 180 degrees, the second character 92 is caused to face the enemy character 93. Thereafter, if the terminal device 7 is rotated to the right by a predetermined angle (e.g., 30 degrees), the second character 92 is caused to turn in a direction away from the enemy character 93, and therefore, the second character 92 is caused to turn by the predetermined angle (e.g., 30 degrees).

As described above, in the present embodiment, when the enemy character 93 is present behind the second character 92, the process of more easily causing the second character 92 to face the enemy character 93 is performed.

[6. Details of Game Process]

Figure 16:
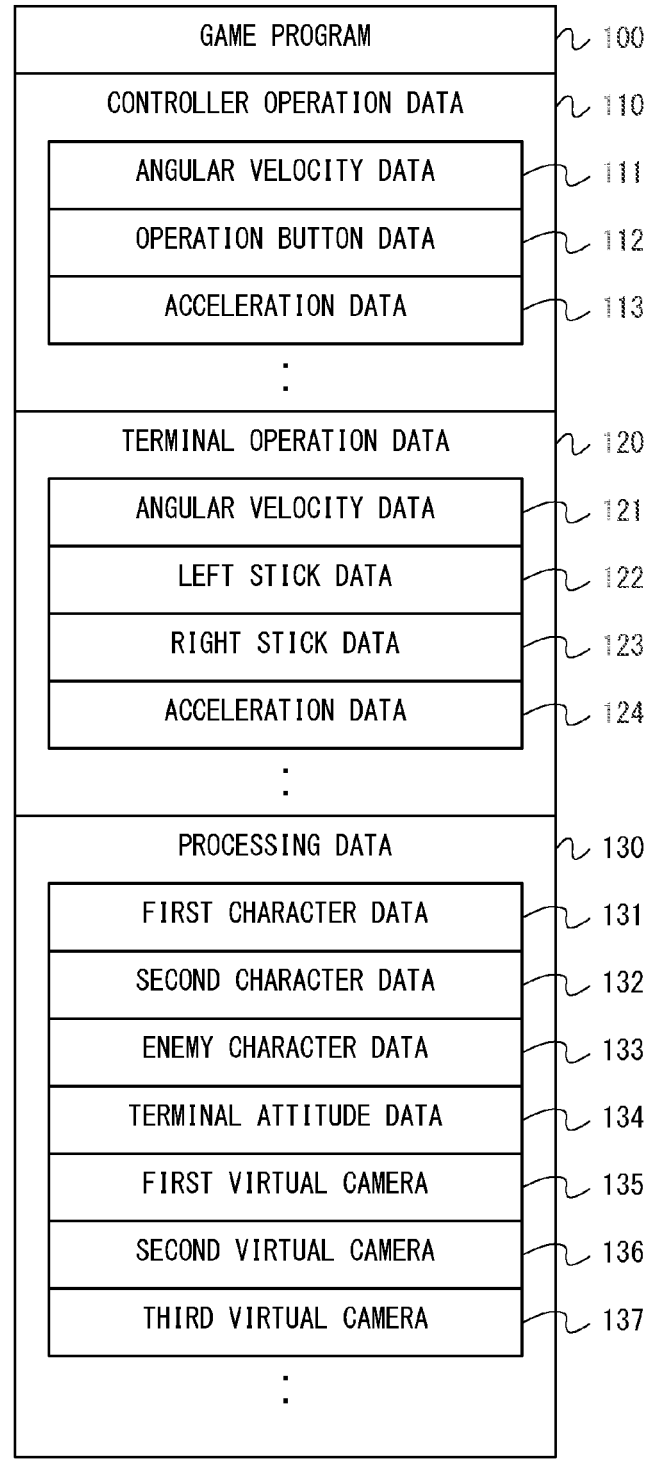
FIG. 16 is a non-limiting example diagram showing data items used in a game process.

Next, the game process executed in the game system will be described in detail. Firstly, various data items used in the game process will be described. FIG. 16 is a non-limiting example diagram showing data items used in the game process. FIG. 16 shows main data items stored in a main memory (an external main memory 12 or an internal main memory 11e) of the game device 3. As shown in FIG. 16, the main memory of the game device 3 stores a game program 100, controller operation data 110, terminal operation data 120, and processing data 130. The main memory includes, in addition to the data items of FIG. 16, data items required for a game, such as image data of objects appearing in the game, audio data used in the game, etc.

The whole or a part of the game program 100 is read from the optical disc 4 into the main memory with appropriate timing after the game device 3 is turned on. The game program 100 may be obtained from the flash memory 17 or a device external to the game device 3 (via, for example, the Internet) instead of the optical disc 4. A part of the game program 100 (e.g., a program for calculating the attitudes of the controller 5 and/or the terminal device 7) may be previously stored in the game device 3.

The controller operation data 110 represents an operation performed on the controller 5. The controller operation data 110 is output (transmitted) from the controller 5 based on an operation performed on the controller 5. The controller operation data 110 is transmitted by the controller 5 and received by the game device 3, and is stored in the main memory. The controller operation data 110 includes angular velocity data 111, operation button data 112, and acceleration data 113. The game device 3 obtains operation data from a plurality of controllers 5 (specifically, the controllers 5a-5c), and stores the controller operation data 110 transmitted from each of the controllers 5 into the main memory. A predetermined number of most recent (latest) pieces of controller operation data 110 may be stored in the form of time series data for each controller 5.

The angular velocity data 111 represents an angular velocity detected by the gyroscopic sensor 48 of the controller 5. Here, the angular velocity data 111 represents an angular velocity about each axis of an X1Y1Z1 coordinate system (see FIG. 3) specific to the controller 5. Thus, in the present embodiment, the controller 5 includes the gyroscopic sensor 48, and the controller operation data 110 includes the angular velocity data 111 as a physical quantity for calculating the attitude of the controller 5. Therefore, the game device 3 can accurately calculate the attitude of the controller 5 based the angular velocity. Specifically, the game device 3 calculates the attitude (rotation angles about the axes of the X1Y1Z1 coordinate system from the initial attitude) of the controller 5 by integrating, with respect to time, an angular velocity about each of the X1-, Y1-, and Z1-axes detected by the gyroscopic sensor 48.

The operation button data 112 represents input states of the operation buttons 32a-32i provided on the controller 5. Specifically, the operation button data 112 represents whether or not each of the operation buttons 32a-32i has been pressed down.

The acceleration data 113 represents an acceleration detected by the acceleration sensor 37 of the controller 5. Here, the acceleration data 113 represents an acceleration about each axis of the X1Y1Z1 coordinate system specific to the controller 5.

The terminal operation data 120 represents an operation performed on the terminal device 7. The terminal operation data 120 is output (transmitted) from the terminal device 7 based on an operation performed on the terminal device 7. The terminal operation data 120 is transmitted by the terminal device 7 and received by the game device 3, and is stored in the main memory. The terminal operation data 120 includes angular velocity data 121, left stick data 122, right stick data 123, and acceleration data 124. The terminal operation data 120 includes, in addition to these data items, operation data of each button, and azimuth data representing an azimuth detected by the magnetic sensor 72 of the terminal device 7.

The angular velocity data 121 represents an angular velocity detected by the gyroscopic sensor 74 of the terminal device 7. Here, the angular velocity data 121 represents an angular velocity about each axis of the XYZ coordinate system (see FIG. 5) specific to the terminal device 7.

The left stick data 122 represents input information of the left analog stick 53A. Specifically, the left stick data 122 is represented by a two-dimensional input vector (InX, InY) which indicates an input direction of the left analog stick 53A. InX is a value along the AX-axis of FIG. 13, and InY is a value along the AY-axis. Here, InX and InY range from −1 to 1, and the maximum length of the input vector is 1. For example, when the up direction is input using the left analog stick 53A, the input vector is (0, 1), and when the down direction is input, the input vector is (0, −1). When the right direction is input using the left analog stick 53A, the input vector is (1, 0), and when the left direction is input, the input vector is (−1, 0). The CPU 10 calculates the input vector (InX, InY) based on the operation information of the left analog stick 53A contained in operation data transmitted from the terminal device 7, and stores the input vector (InX, InY) as the left stick data 122 in the main memory.

The right stick data 123 represents input information of the right analog stick 53B. Similar to the left stick data 122, the right stick data 123 is represented by a two-dimensional vector.

Figure 17:
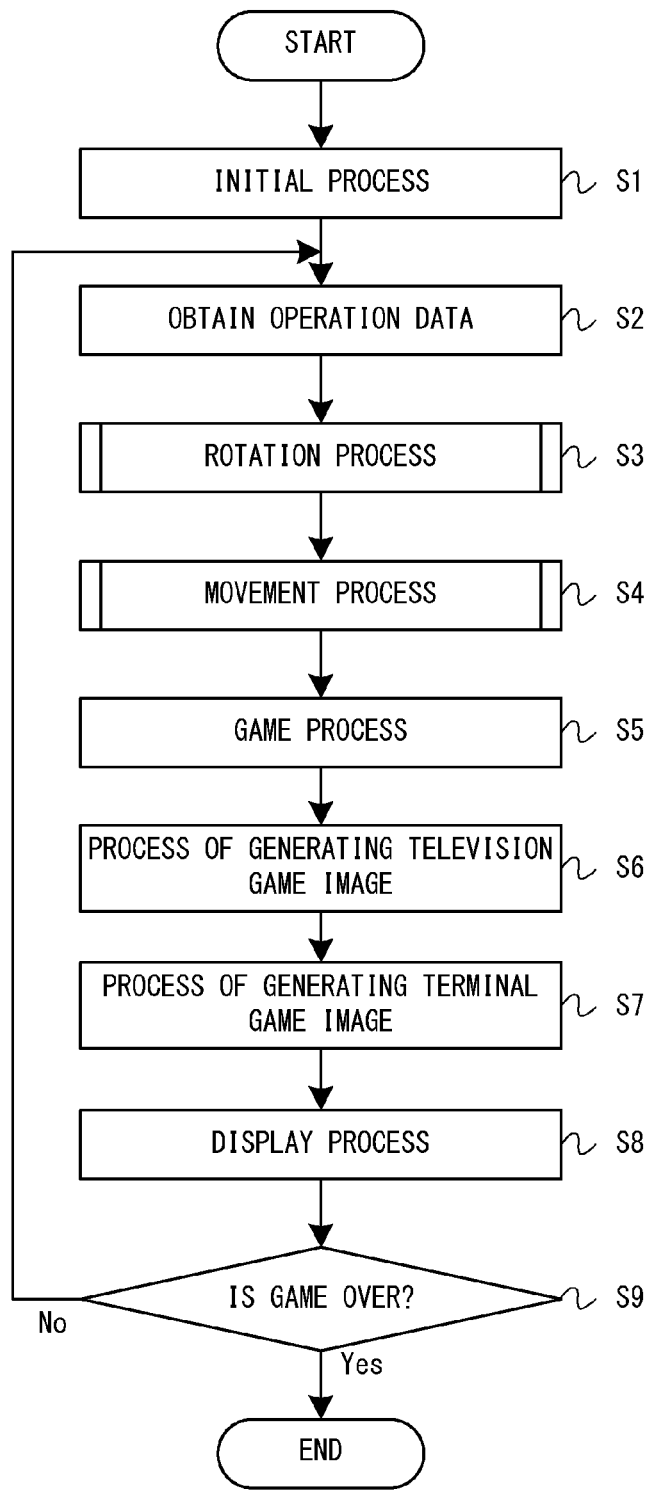
FIG. 17 is a non-limiting example main flowchart showing a flow of a game process executed in the game device 3.

The processing data 130 is used in a game process described below (FIG. 17). The processing data 130 includes first character data 131, second character data 132, enemy character data 133, terminal attitude data 134, first virtual camera data 135, second virtual camera data 136, and third virtual camera data 137. The processing data 130 includes, in addition to the data items of FIG. 16, various data items used in the game process, such as data representing the attitude of the controller 5, data representing parameters set for objects appearing in a game, etc.

The first character data 131 represents various information items relating to the first character 91, including data representing the position and orientation (attitude) in the game space of each of the first characters 91a-91c. The first character data 131 also includes data representing the vitality of each first character, data representing the attitudes of the sword objects 91a-91c, data representing the positions of the guide objects 94a-94c corresponding to the respective first characters, and data representing a target to be attacked by each first character.

The second character data 132 represents various information items relating to the second character 92, including data representing the position and orientation (attitude) in the game space of the second character 92. The second character data 132 also includes data representing the number of remaining arrow objects 97, data representing the vitality of the second character 92, etc.

The enemy character data 133 represents various information items relating to the enemy characters 93, including the position and orientation in the game space of each enemy character 93. The enemy character data 133 also includes data representing the vitality of each enemy character 93, etc.

The terminal attitude data 134 represents the attitude of the terminal device 7. The attitude of the terminal device 7 may, for example, be represented by a rotation matrix indicating a rotation from a basic attitude (e.g., the attitude of FIG. 6) to the current attitude, or rotation angles about the X-, Y-, and Z-axes. The terminal attitude data 134 is calculated based on the angular velocity data 121 contained in the terminal operation data 120 from the terminal device 7. Specifically, the terminal attitude data 134 is calculated by integrating, with respect to time, an angular velocity about each of the X-, Y-, and Z-axes detected by the gyroscopic sensor 74.

The first virtual camera data 135 represents the positions and attitudes in the game space of the first virtual cameras A-C which are set (fixed) behind the first characters 91a-91c, respectively. As described above, the first virtual camera A is set behind the first character 91a, and the shooting direction of the virtual camera is set to be the same as the orientation of the first character 91a. The first virtual camera B is set behind the first character 91b, and the shooting direction of the virtual camera is set to be the same as the orientation of the first character 91b. The first virtual camera C is set behind the first character 91c, and the shooting direction of the virtual camera is set to be the same as the orientation of the first character 91c.

The second virtual camera data 136 represents the position and attitude in the game space of the second virtual camera which is set (fixed) at the right rear of the second character 92.

The third virtual camera data 137 represents the position and attitude in the game space of the third virtual camera which is set (fixed) behind the second character 92.

(Description of Flowchart)

Next, the game process executed in the game device 3 will be described in detail with reference to FIGS. 17-21. FIG. 17 is a non-limiting example main flowchart showing a flow of the game process executed in the game device 3. When the game device 3 is turned on, the CPU 10 of the game device 3 executes a boot program stored in a boot ROM (not shown) to initialize units such as the main memory. A game program stored in the optical disc 4 is read into the main memory, and the CPU 10 begins to execute the game program. The process of the flowchart of FIG. 17 is executed after the above process has been completed. In the game device 3, the game program may be executed immediately after the game device 3 is turned on, or alternatively, a built-in program for displaying a predetermined menu screen may be initially executed after the game device 3 is turned on, and thereafter, the game program may be executed in response to, for example, an instruction to start a game which is issued by a user's selection operation to the menu screen.

The steps of the flowcharts of FIGS. 17-21 are merely illustrative, and the order in which the steps are performed may be changed as long as similar advantages are obtained. The values of variables and constants, etc., are also merely illustrative, and other values may be optionally used. In the present embodiment, it is assumed that the steps of the flowcharts are executed by the CPU 10. Alternatively, a part of the steps may be executed by a processor or a dedicated circuit other than the CPU 10.

In step S1, the CPU 10 executes an initial process. The initial process is used to construct a virtual game space, arrange objects appearing in the game space (the first and second characters, the enemy characters, the virtual cameras, other objects put in the game space, etc.) at initial positions, and set various parameters used in the game process to initial values. For example, the CPU 10 initializes the front direction vector indicating the orientation of the second character 92 contained in the second character data 132, a rotation angle to be input using the left analog stick 53A, and a rotation angle to be input using the attitude of the terminal device 7. The CPU 10 also initializes the back direction degree BR (described in detail below). After step S1, the CPU 10 executes step S2. Thereafter, a loop of steps S2-S9 is repeatedly executed at a rate of once per predetermined period of time (one frame time, e.g., 1/60 sec).

In step S2, the CPU 10 obtains operation data which has been transmitted from the terminal device 7 and the three controllers 5 and stored in the main memory. The terminal device 7 and the controllers 5 repeatedly transmit operation data (terminal operation data and controller operation data) to the game device 3. In the game device 3, the terminal transmission module 28 sequentially receives terminal operation data, which is then sequentially stored into the main memory by the input/output processor 11a. The controller communication module 19 sequentially receives controller operation data, which is then sequentially stored into the main memory by the input/output processor 11a. A transmission/reception interval between the controller 5 and the game device 3 and a transmission/reception interval between the terminal device 7 and the game device 3 are preferably shorter than a game processing time (one frame time), and are one two-hundredth of a second, for example. In step S2, the CPU 10 reads latest controller operation data 110 and latest terminal operation data 120 from the main memory. After step S2, step S3 is executed.

In step S3, the CPU 10 executes a rotation process. The rotation process is to rotate, in the game space, the second character 92 which is operated using the terminal device 7. The rotation process will be described in detail hereinafter with reference to FIG. 18.

Figure 18:
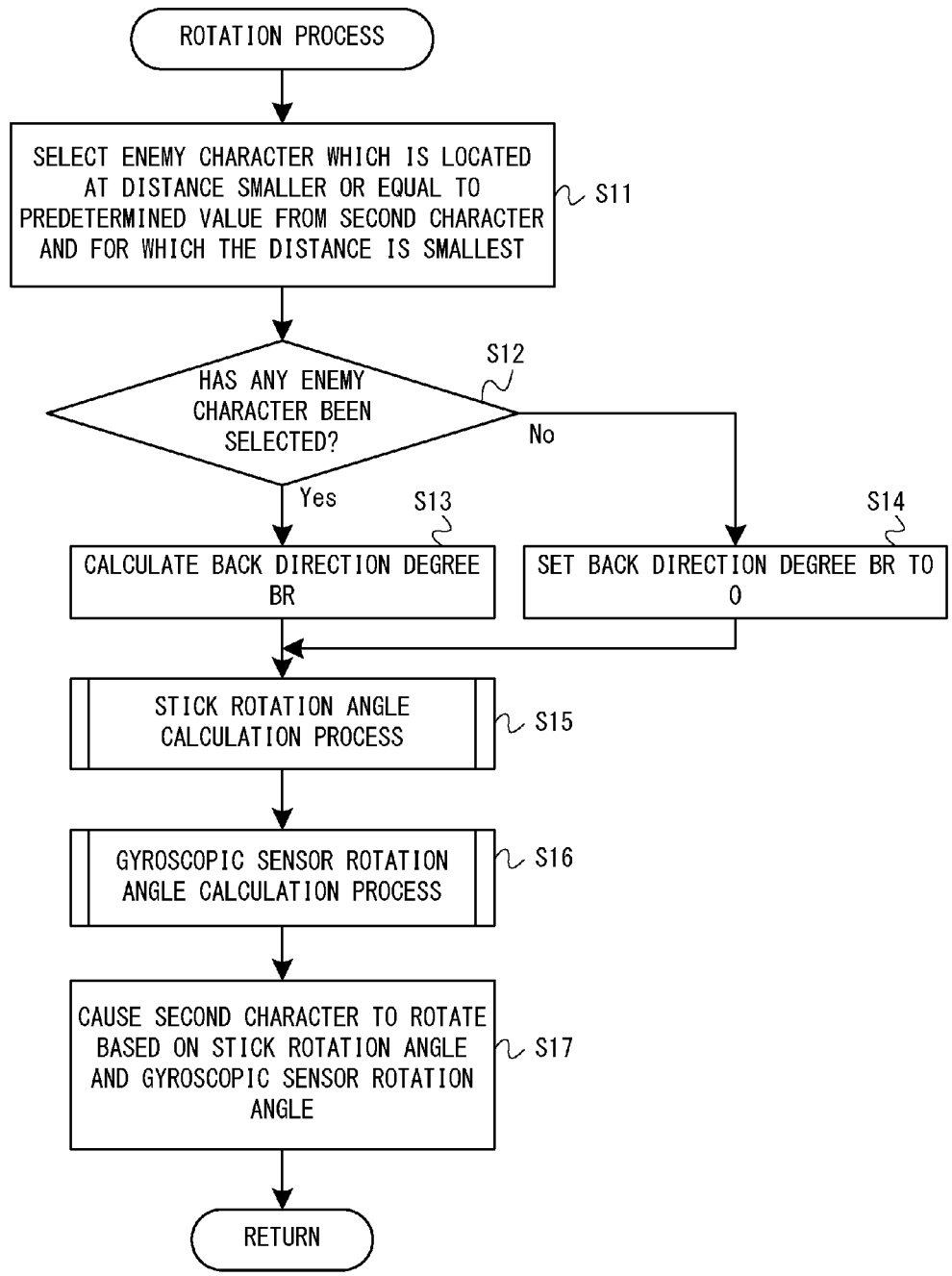
FIG. 18 is a non-limiting example flowchart showing a detailed flow of a rotation process (step S3) of FIG. 17.

FIG. 18 is a non-limiting example flowchart showing a detailed flow of the rotation process (step S3) of FIG. 17.

In step S11, the CPU 10 finds or selects an enemy character 93 which is located at a distance having a predetermined value or less from the second character 92 and for which the distance from the second character 92 is smallest. Specifically, the CPU 10 calculates a distance between the second character 92 and each enemy character 93 by referencing the second character data 132 and the enemy character data 133. Thereafter, the CPU 10 finds or selects an enemy character 93 whose distance from the second character 92 is smaller than or equal to the predetermined value and is smallest. Even when an enemy character 93 has the smallest distance from the second character 92, then if the distance exceeds the predetermined value, the CPU 10 does not select the enemy character 93. Next, the CPU 10 executes step S12.

In step S12, the CPU 10 determines whether or not an enemy character 93 has been selected. If the determination result is positive (i.e., in step S11, an enemy character 93 has been selected in step S11), the CPU 10 next executes step S13. On the other hand, if the determination result is negative, the CPU 10 next executes step S14.

Figure 22:
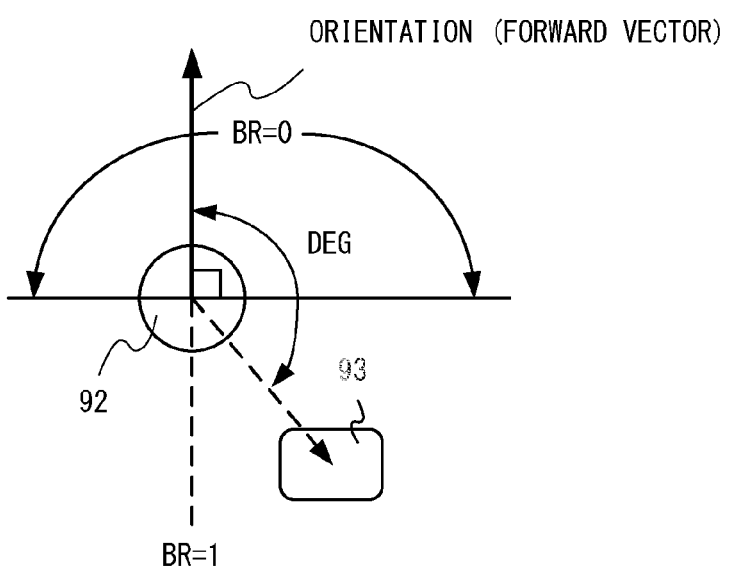
FIG. 22 is a non-limiting example diagram showing the second character 92 and the enemy character 93 as viewed from above in the game space, and an angle determined by the second character 92 and the enemy character 93.

In step S13, the CPU 10 calculates the back direction degree BR. The back direction degree BR changes depending on an angle determined by the second character 92 and the enemy character 93. FIG. 22 is a non-limiting example diagram showing the second character 92 and the enemy character 93 as viewed from above in the game space, and the angle determined by the second character 92 and the enemy character 93. Specifically, the CPU 10 calculates an angle DEG formed by a vector (front direction vector) indicating the orientation of the second character 92 and a vector from the second character 92 toward the enemy character 93. When the absolute value of the angle DEG determined by the second character 92 and the enemy character 93 is greater than 90 degrees, the CPU 10 calculates the back direction degree by:

$$\text{the back direction degree } BR = (\text{the absolute value of } DEG - 90)/90 \quad (1)$$

When the absolute value of the angle DEG is smaller than or equal to 90 degrees, the CPU 10 sets the back direction degree BR to zero. That is, the back direction degree BR is one when the enemy character 93 is located directly behind the second character 92 (180 degrees), and zero when the enemy character 93 is located in front of a line extending through the second character 92 in the left-right direction. The CPU 10 stores the calculated back direction degree BR into the main memory, and next executes step S15.

On the other hand, in step S14, since no enemy characters 93 are present around the second character 92 (within the predetermined range), the CPU 10 sets the back direction degree BR to zero. The CPU 10 next executes step S15.

In step S15, the CPU 10 calculates a rotation angle which is input using a stick. In step S15, the CPU 10 calculates a rotation angle of the second character 92 based on an input operation (the first input operation) which has been made using the left analog stick 53A. The stick rotation angle calculation process will be described in detail hereinafter with reference to FIG. 19.

Figure 19:
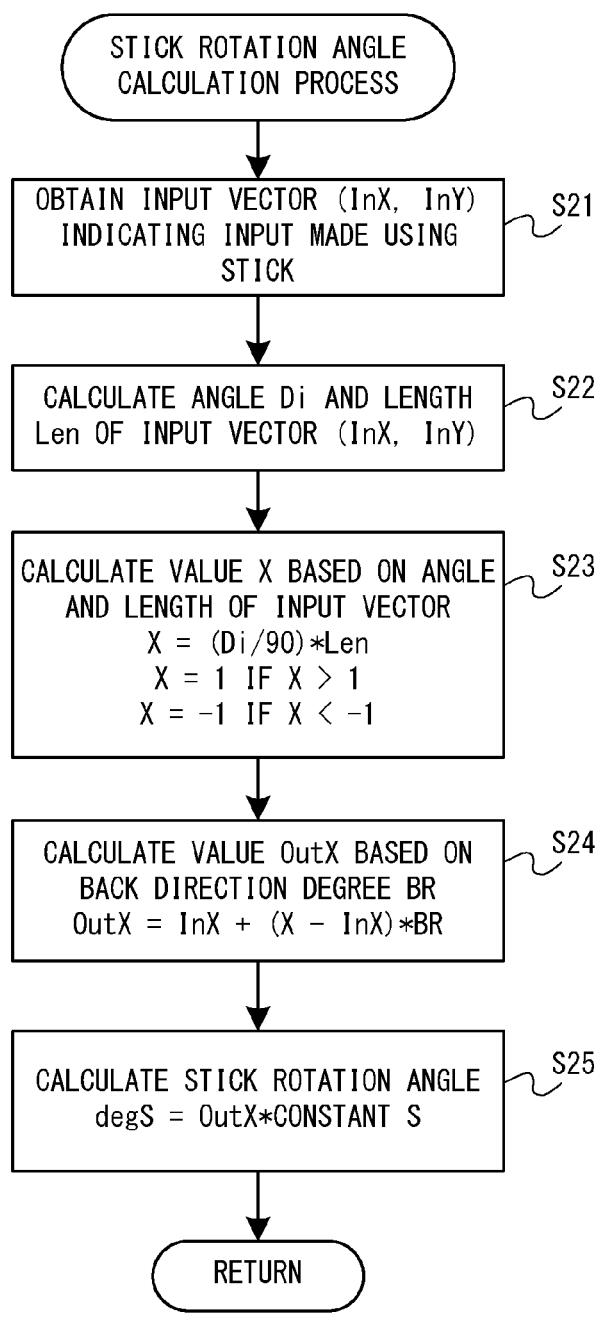
FIG. 19 is a non-limiting example flowchart showing a detailed flow of a stick rotation angle calculation process (step S15) of FIG. 18.

FIG. 19 is a non-limiting example flowchart showing a detailed flow of the stick rotation angle calculation process (step S15) of FIG. 18.

In step S21, the CPU 10 obtains the input vector (InX, InY) (the left stick data 122) indicating an input operation performed on the left analog stick 53A by referencing the main memory. Next, the CPU 10 executes step S22.

In step S22, the CPU 10 calculates an angle Di and a length Len of the input vector. The angle Di of the input vector is measured with reference to the up direction of the left analog stick 53A. Specifically, the CPU 10 calculates the angle Di by:

$$Di = \arccos(InY/Len) \quad (2)$$

If InX is negative, the CPU 10 multiplies Di calculated by expression (2) by −1 and stores the result as the angle Di into the main memory. If Len is zero, Di=0. Next, the CPU 10 executes step S23.

In step S23, the CPU 10 calculates a value X based on the angle Di and the length Len of the input vector. Specifically, the CPU 10 calculates the value X by:

$$X = (Di/90) \times Len \quad (3)$$

Here, the CPU 10 sets the value X to 1 if X>1 and −1 if X<−1, and stores the resulting value X into the main memory. Next, the CPU 10 executes step S24.

In step S24, the CPU 10 calculates a value OutX based on the back direction degree BR. Specifically, the CPU 10 calculates the value OutX by:

$$OutX = InX + (X - InX) \times BR \quad (4)$$

Here, the value OutX indicates the rotation angle of the second character 92 based on an input which has been made using the left analog stick 53A. Specifically, the value OutX can be said to be the value InX in the horizontal direction of the input vector indicating the input direction of the left analog stick 53A, which has been adjusted based on a relative position relationship between the second character 92 and the enemy character 93. For example, if the back direction degree BR is zero (i.e., the enemy character 93 is located in front of a line extending through the second character 92 in the left-right direction), OutX=InX. That is, if the enemy character 93 is located in front of the second character 92, the second character 92 is caused to turn directly using the left or right direction input using the left analog stick 53A. If the back direction degree BR is one (i.e., the enemy character 93 is located directly behind the second character 92), OutX=X. That is, if the enemy character 93 is located directly behind the second character 92, the second character 92 is controlled using the value X (calculated using expression (3)) instead of InX of the input vector. Specifically, if the enemy character 93 is located directly behind the second character 92, then when the down direction is input using the left analog stick 53A, InX=0 and InY=−1, and according to expression (2), the angle Di=180. If the angle Di=180 is substituted into expression (3), X=1 (although X=2 according to expression (3), X is set to 1). In other words, if the enemy character 93 is located directly behind the second character 92, when the down direction is input using the left analog stick 53A, the second character 92 is controlled in the same manner as when the left or right direction is input.

For example, if the enemy character 93 is located directly behind the second character 92, then when the lower right direction is input using the left analog stick 53A, X>InX according to expression (3) and therefore OutX>InX. That is, if the enemy character 93 is located directly behind the second character 92, the second character 92 is caused to turn by a larger rotation angle than an actual rotation angle corresponding to an input operation performed on the left analog stick 53A. The back direction degree BR increases as the angle determined by the second character 92 and the enemy character 93 is closer to 180 degrees. Therefore, as the enemy character 93 is closer to a position directly behind the second character 92, OutX increases. Therefore, as the enemy character 93 is located closer to a position directly behind the second character 92, the angle by which the second character 92 is rotated increases.

If the enemy character 93 is located directly behind the second character 92, then when the upper right direction is input using the left analog stick 53A, OutX=X according to expression (4). Here, if the angle Di of the input vector is 30 degrees and the length Len is 1, InX=½. On the other hand, if the angle Di=30 degrees and the length Len=1, X=⅓ according to expression (3). That is, if the enemy character 93 is located directly behind the second character 92, then when the upper right direction is input using the left analog stick 53A, the value OutX may be smaller than the value InX. This means that if the enemy character 93 is located directly behind the second character 92, then when the second player inputs the upper right direction using the left analog stick 53A, the clockwise turning of the second character 92 is weakened. That is, in this case, the second character 92 is rotated clockwise by a smaller rotation angle than an actual input rotation angle, and therefore, the second character 92 is more easily caused to move forward. If the enemy character 93 is located directly behind the second character 92, then when the up direction is input using the left analog stick 53A, it is considered that the second player is deliberately operating in order to cause the second character 92 to escape from the enemy character 93. Therefore, in this case, by facilitating forward movement of the second character 92, the second player can cause the second character 92 to move in his or her intended manner.

Thus, the actual input value InX of the left analog stick 53A is adjusted based on the relative position relationship between the second character 92 and the enemy character 93 to calculate OutX. After step S24, the CPU 10 executes step S25.

In step S25, the CPU 10 calculates a rotation angle degS of the left analog stick 53A. Specifically, the CPU 10 calculates the rotation angle degS by:

$$\deg S = -\text{Out}X \times \text{constant } S \quad (5)$$

where the constant S is a predetermined value which relates to the rotation speed of the second character 92 rotated by an operation performed on the left analog stick 53A. The sign of OutX is inverted in expression (5) in order to match a rotation direction which is calculated by a gyroscopic sensor rotation angle calculation process described below. After step S25, the CPU 10 ends the stick rotation angle calculation process of FIG. 19.

Referring back to FIG. 18, the CPU 10 next executes step S16. In the gyroscopic sensor rotation angle calculation process of step S16, the CPU 10 calculates a rotation angle of the second character 92 based on an input operation (the second input operation) performed by changing the attitude of the terminal device 7. The gyroscopic sensor rotation angle calculation process will be described in detail hereinafter with reference to FIG. 20.

Figure 20:
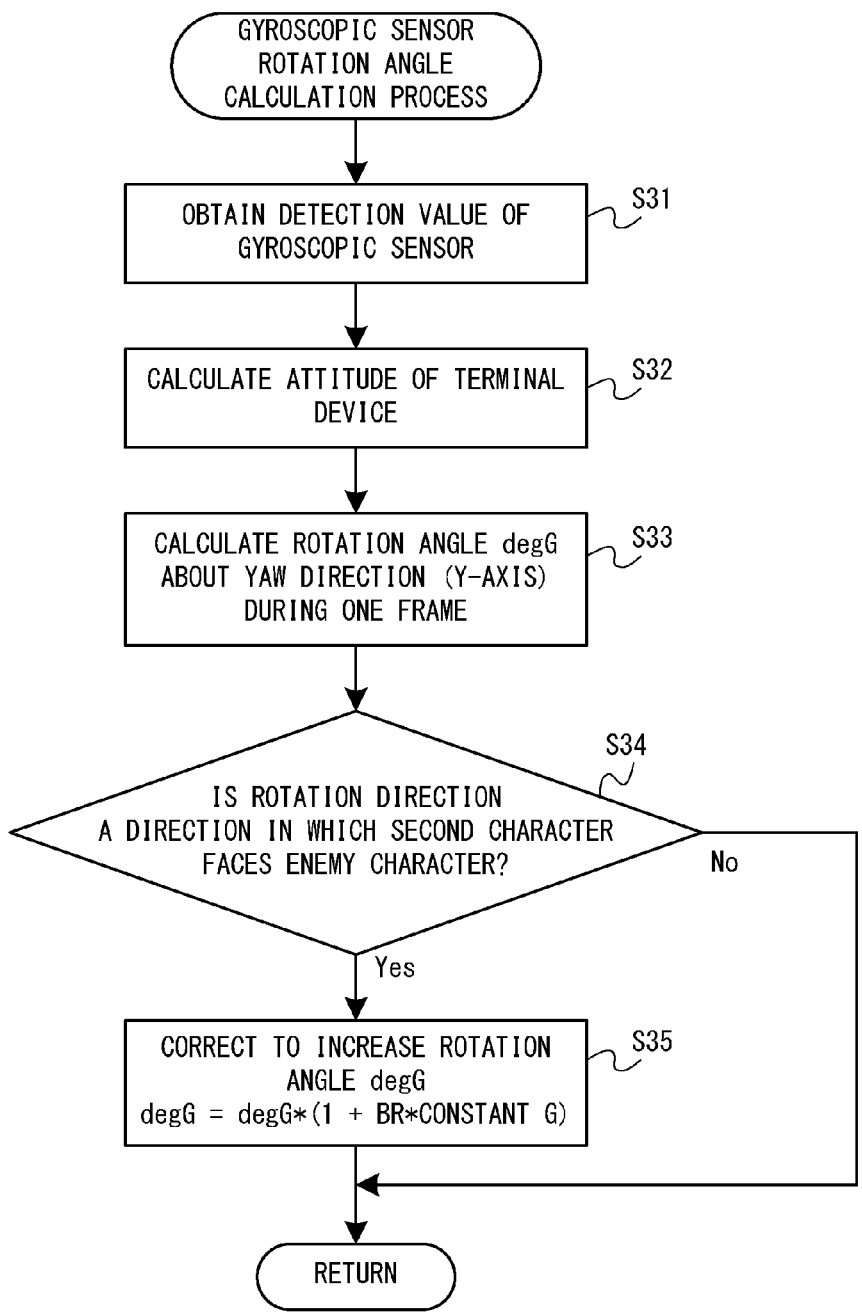
FIG. 20 is a non-limiting example flowchart showing a detailed flow of a gyroscopic sensor rotation angle calculation process (step S16) of FIG. 18.

FIG. 20 is a non-limiting example flowchart showing a detailed flow of the gyroscopic sensor rotation angle calculation process (step S16) of FIG. 18.

In step S31, by referencing the angular velocity data 121 in the main memory, the CPU 10 obtains detection values (values indicating angular velocities about the X-, Y-, and Z-axes) of the gyroscopic sensor 74 of the terminal device 7. Next, the CPU 10 executes step S32.

In step S32, the CPU 10 calculates the attitude of the terminal device 7. Specifically, the CPU 10 calculates (obtains) the attitude of the terminal device 7 based on the detection values obtained in step S31. The CPU 10 can calculate rotation angles about the X-, Y-, and Z-axes from the initial attitude by integrating, with respect to time, an angular velocity about each of the X-, Y-, and Z-axes detected by the gyroscopic sensor 74. The CPU 10 stores the calculated data representing the attitude of the terminal device 7 as the terminal attitude data 134 in the main memory. In step S32, the CPU 10 may correct the attitude of the terminal device 7 based on the acceleration data 124 (an acceleration detected by the acceleration sensor 73 of the terminal device 7). Next, the CPU 10 executes step S33.

In step S33, the CPU 10 calculates a rotation angle degG in a yaw direction (about the Y-axis) during one frame based on the attitude of the terminal device 7 calculated in the previous frame (the attitude calculated in step S32 in the previous process loop) and the attitude of the terminal device 7 calculated in the current frame. Next, the CPU 10 executes step S34.

In step S34, the CPU 10 determines whether or not a rotation direction indicated by the rotation angle degG is a direction in which the second character 92 faces the enemy character 93. Here, the CPU 10 determines whether or not the second character 92 is rotated to face the enemy character 93 when the second character 92 is rotated by the rotation angle degG calculated in step S33. For example, if the angle determined by the second character 92 and the enemy character 93 is 150 degrees, then when the rotation angle degG calculated in step S33 is 10 degrees (clockwise rotation by 10 degrees), the CPU 10 determines that the rotation direction indicated by the rotation angle degG is a direction in which the second character 92 faces the enemy character 93. On the other hand, for example, if the angle determined by the second character 92 and the enemy character 93 is 150 degrees, then when the rotation angle degG calculated in step S33 is −10 degrees (counterclockwise direction by 10 degrees), the CPU 10 does not determine that the rotation direction indicated by the rotation angle degG is a direction in which the second character 92 faces the enemy character 93. If the determination result is positive, the CPU 10 next executes step S35. If the determination result is negative, the CPU 10 ends the gyroscopic sensor rotation angle calculation process of FIG. 20.

In step S35, the CPU 10 corrects the rotation angle degG so that degG increases. Specifically, the CPU 10 corrects the rotation angle degG by:

$$degG=degG \times (1+BR \times \text{constant } G) \quad (6)$$

where the constant G is a predetermined positive value which relates to the rotation speed of the second character 92 which is rotated based on a change in the attitude of the terminal device 7. As can be seen from expression (6), the corrected rotation angle degG increases with an increase in the back direction degree BR.

Thus, when the second character 92 is rotated by rotating the terminal device 7 so that the second character 92 faces the enemy character 93, the rotation angle degG is greater than the actual rotation amount of the terminal device 7. Therefore, the second character 92 is rotated in the game space by a larger rotation amount than the actual rotation amount of the terminal device 7. As a result, when the player rotates the terminal device 7 so that the second character 92 faces the enemy character 93, the player does not need to rotate the terminal device 7 by a large rotation amount so that the second character 92 faces the enemy character 93. For example, when the enemy character 93 is located directly behind the second character 92, the second character 92 can be rotated by a large angle by rotating the terminal device 7 slightly. After step S35, the CPU 10 ends the gyroscopic sensor rotation angle calculation process of FIG. 20.

Referring back to FIG. 18, the CPU 10 next executes step S17. In step S17, the CPU 10 causes the second character 92 to rotate based on the stick rotation angle degS calculated in step S15 and the gyroscopic sensor rotation angle degG calculated in step S16. Specifically, the CPU 10 calculates the sum of the rotation angle degS and the rotation angle degG, and rotates the front direction vector of the second character 92 about the y-axis (an axis extending vertically upward from the ground) in the game space by the calculated angle. After step S17, the CPU 10 ends the rotation process of FIG. 18.

Referring back to FIG. 17, the CPU 10 next executes step S4. In step S4, the CPU 10 executes a movement process. In the movement process, the second character 92 and the first character 91 are caused to move in the game space. The movement process will be described in detail hereinafter with reference to FIG. 21.

Figure 21:
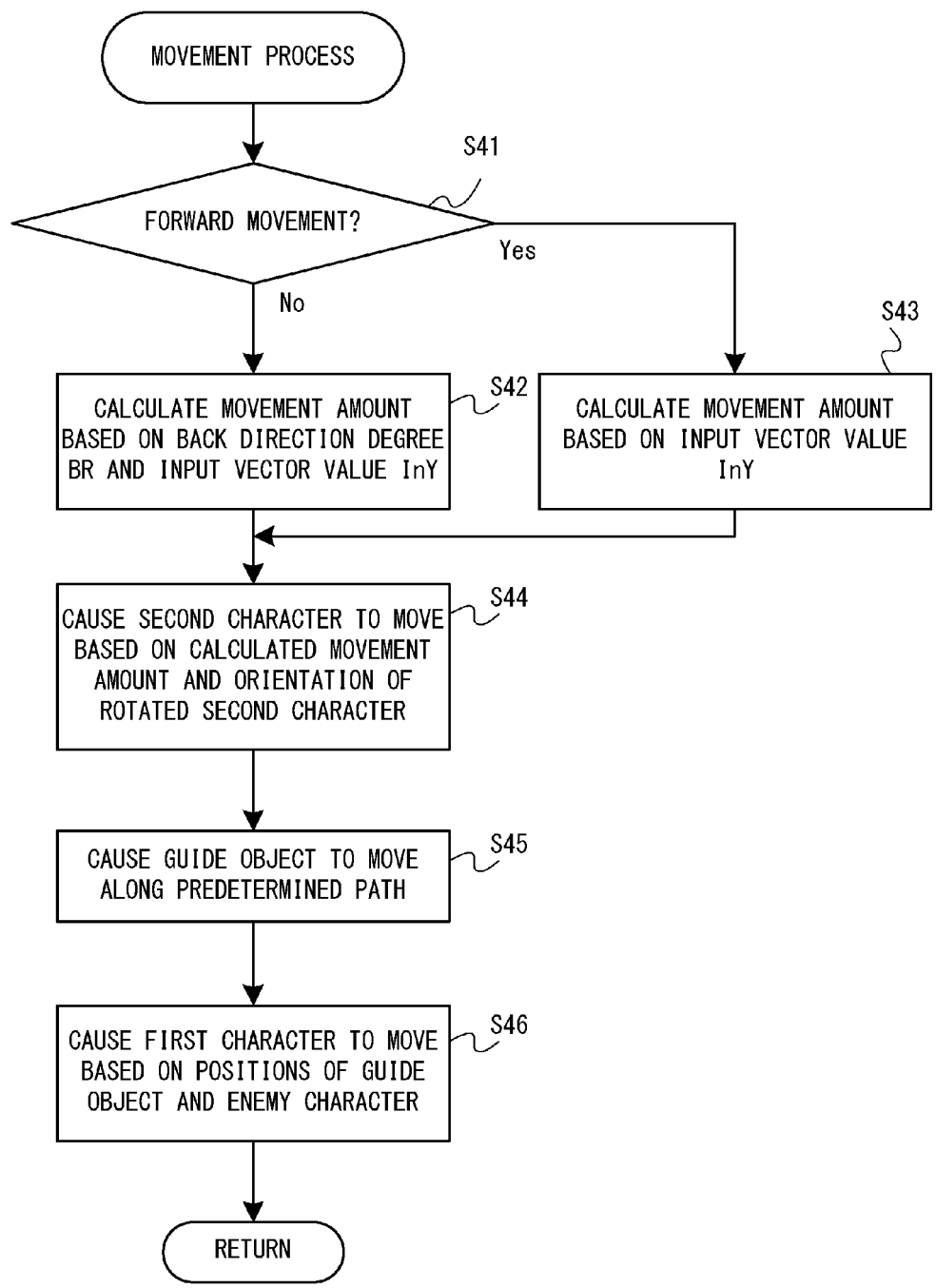
FIG. 21 is a non-limiting example flowchart showing a detailed flow of a movement process (step S4) of FIG. 17.

FIG. 21 is a non-limiting example flowchart showing a detailed flow of the movement process (step S4) of FIG. 17.

In step S41, the CPU 10 determines whether or not a movement direction of the second character 92 is a front direction. Specifically, the CPU 10 determines whether or not the value InY of the input vector is greater than or equal to zero. If the determination result is negative, the CPU 10 next executes step S42. On the other hand, if the determination result is positive, the CPU 10 next executes step S43.

In step S42, the CPU 10 calculates a movement amount of the second character 92 based on the back direction degree BR and the value InY of the stick input vector. Specifically, the CPU 10 calculates the movement amount of the second character 92 so that the movement amount of the second character 92 increases with a decrease in the back direction degree BR. More specifically, if the back direction degree BR is one, the movement amount of the second character 92 is zero. If the back direction degree BR is zero, the movement amount of the second character 92 is a value corresponding to the value InY of the input vector. The CPU 10 also calculates the movement amount of the second character 92 so that the movement amount of the second character 92 increases with an increase in the absolute value of the value InY of the input vector. After step S42, the CPU 10 executes step S44.

In step S43, the CPU 10 calculates the movement amount of the second character 92 based on the value InY of the input vector. For example, the CPU 10 calculates the product of InY and a predetermined constant as the movement amount of the second character 92. Next, the CPU 10 executes step S44.

In step S44, the CPU 10 causes the second character 92 to move based on the movement amount calculated in step S42 or S43 and the orientation of the second character 92 rotated in step S3. For example, the CPU 10 multiplies the calculated movement amount by a unit vector indicating the orientation of the second character 92 to calculate a movement vector. Thereafter, the CPU 10 adds the movement vector to a position vector indicating the current position of the second character 92, thereby updating the position of the second character 92.

As described above, the second character 92 is caused to rotate (step S3), and the movement amount of the second character 92 is calculated (step S42 or S43). Thus, by controlling the movement of the second character 92, the second character 92 performs a motion as follows. For example, if the enemy character 93 is located directly after the second character 92, then when the player inputs the down direction using the left analog stick 53A, the second character 92 does not retreat or move backward (movement amount is zero) and turns. Moreover, if the player continues to input the down direction of the left analog stick 53A, the enemy character 93 is located diagonally behind the second character 92 rather than directly behind the second character 92. In this case, the back direction degree BR is smaller than one, and the movement amount of the second character 92 is greater than zero. Therefore, the second character 92 retreats or moves backward while turning. That is, if the enemy character 93 is located directly behind the second character 92, then when the player continues to input the down direction of the left analog stick 53A, the second character 92 initially only rotates before moving while rotating. As a result, the second character 92 rotates while moving and keeping a distance from the enemy character 93. That is, if the enemy character 93 is located behind the second character 92, the player can cause the second character 92 to face the enemy character 93 while keeping a distance from the enemy character 93. This motion can be said to be suitable for an attack using a bow. In other words, when a weapon such as a bow is used to attack a distant enemy, then if the distance to the attack target is excessively short, it is difficult to attack the target. In some instances, it may be better to keep a distance from the attack target.

Next, the CPU 10 executes step S45. By executing steps S45 and S46, the first character 91 is caused to move in the game space.

In step S45, the CPU 10 causes the guide object 94a-94c corresponding to the first characters 91a-91c to move along predetermined paths. That is, the CPU 10 causes the guide object 94a-94c to move along the paths 98a-98c previously set. The CPU 10 controls the position of the guide object 94 so that a distance between the first character 91 and the corresponding guide object 94 is not greater than or equal to a predetermined value. Next, the CPU 10 executes step S46.

In step S46, the CPU 10 causes the first character 91 to move based on the positions of the guide object 94 and the enemy character 93. Specifically, if no enemy characters 93 are present within a predetermined range around the first character 91a, the CPU 10 causes the first character 91a to move, following the guide object 94a (updates the position and orientation of the first character 91*a*). When an enemy character 93 is present within the predetermined range, the CPU 10 causes the first character 91*a* to move toward the enemy character 93 (updates the position and orientation of the first character 91*a*, and stores the updated values into the main memory). If the first character 91*a* is located closer to the enemy character 93 and is fighting with the enemy character 93, the CPU 10 does not cause the first character 91*a* to move until the first character 91*a* kills or beats the enemy character 93. The CPU 10 similarly updates the positions and orientations of the other first characters 91. After step S46, the CPU 10 ends the movement process of FIG. 21.

Referring back to FIG. 17, the CPU 10 next executes step S5. In step S5, the CPU 10 executes a game process. In the game process, a process of causing each character to attack and a process based on the attack result (e.g., a process of decreasing the vitality of the attacked enemy character 93, etc.) are performed. Specifically, the attitude of the controller 5 is calculated based on the angular velocity data 111 (data representing an angular velocity detected by the gyroscopic sensor 48 of the controller 5), and based on this attitude, the attitude of the sword object 95 is determined. Thereafter, based on a position relationship between the sword object 95 and the enemy character 93, it is determined whether or not the attack on the enemy character 93 is successful (the sword object 95 has hit the enemy character 93). In this case, the CPU 10 may determine whether or not the controller 5 has been swung, by referencing the acceleration data 113 (data representing an acceleration detected by the acceleration sensor 37 of the controller 5). The CPU 10 also determines, by referencing the right stick data 123, whether or not to shoot the arrow object 97 in response to an input operation performed on the right analog stick 53B, and based on the determination result, shoots the arrow object 97 in the game space. In this case, for example, the arrow object 97 is shot from the position of the second character 92 toward a position in the game space corresponding to the center of the screen of the LCD 51. The arrow object 97 thus shot is caused to move in the game space on a path which is determined, taking the influence of gravity and the like into consideration. Thereafter, it is determined whether or not the moving arrow object 97 has contacted another object (the enemy character 93 or other obstacles), and if the moving arrow object 97 has contacted another object, the arrow object 97 is stopped. Also, a process of causing the enemy character 93 to move in the game space is performed. When the cross button 32*a* of each controller 5 is pressed, the selection object 99 is moved so that the attack target is changed to another enemy character 93. The CPU 10 also updates the position and orientation of the virtual camera set for each player character (91, 92) based on the position and orientation of each player character (or the attitude of the terminal device 7). The CPU 10 next executes step S6.

In step S6, the CPU 10 executes a process of generating a television game image. In step S6, the images 90*a*, 90*b*, 90*c*, and 90*d* to be displayed on the television 2 are generated. Specifically, the CPU 10 obtains an image by shooting the game space using the first virtual camera A set behind the first character 91*a*. Here, if a plurality of enemy characters 93 are present within a predetermined range around the first character 91*a*, the CPU 10 superimposes the image of the selection object 99*a* on the obtained image to generate the image 90*a* to be displayed on the upper left region of the television 2. Similarly, the CPU 10 shoots the game space using the first virtual camera B set behind the first character 91*b* to generate the image 90*b*. The CPU 10 shoots the game space using the first virtual camera C set behind the first character 91*c* to generate the image 90*c*. The CPU 10 shoots the game space using the second virtual camera set at the right rear of the second character 92 to generate the image 90*d*. Thereafter, the CPU 10 combines the four generated images 90*a*-90*d* to generate a television game image. The image 90*a* is put in the upper left region of the television game image, the image 90*b* is put in the upper right region, the image 90*c* is put in the lower left region, and the image 90*d* is put in the lower right region. The CPU 10 next executes step S7.

In step S7, the CPU 10 executes a process of generating a terminal game image. Specifically, the CPU 10 shoots the game space using the third virtual camera set behind the second character 92 to generate the image 90*e* (terminal game image). The CPU 10 next executes step S8.

In step S8, the CPU 10 executes a display process (process of outputting a game image). Here, the television game image generated in step S6 is output to the television 2, and the terminal game image generated in step S7 is output (transmitted) to the terminal device 7. As a result, the television 2 displays an image as shown in FIG. 11, and the LCD 51 of the terminal device 7 displays an image as shown in FIG. 12. In step S8, audio data is output along with the game image to the television 2 and/or the terminal device 7, and game audio is output from the speaker 2*a* of the television 2 and/or the speaker 77 of the terminal device 7. The CPU 10 next executes step S9.

In step S9, the CPU 10 determines whether or not to end the game. The determination in step S9 is performed based on, for example, whether or not the game is over, whether or not the user issues an instruction to stop the game, or the like. If any of the first characters 91*a*-91*c* and the second character 92 is killed or beaten by the enemy character 93 (attacked a predetermined number of times), the game is over. If the determination result of step S9 is negative, step S2 is executed again. On the other hand, if the determination result of step S9 is positive, the CPU 10 ends the game process of FIG. 20.

As described above, in the game of the present embodiment, at least one player who operates the controller 5 and a player who operates the terminal device 7 cooperate with each other to play the game. The first character 91 operated using the controller 5 automatically moves based on the predetermined path in the game space. The second character 92 operated using the terminal device 7 moves based on an input operation performed on the terminal device 7 (an input operation performed on the left analog stick 53A, and an input operation performed by changing the attitude of the terminal device 7). That is, the movement direction and movement amount of the first character 91 are automatically controlled, and the movement direction and movement amount of the second character 92 are controlled by a player's input. Thus, the first character 91 moves with a first degree of freedom (specifically, moves along the predetermined path), and the second character 92 moves with a second degree of freedom higher than the first degree of freedom (specifically, moves through predetermined arbitrary positions on a plane based on an operation performed on the terminal device 7). Thus, the movement of the first character 91 operated by the controller 5 is limited, and the second character 92 operated by the terminal device 7 is allowed to freely move, whereby a novel game played by a plurality of players can be provided. That is, in the game, the first player who operates the first character 91 plays the game under a predetermined limit (with the first degree of freedom) while viewing the screen of the television 2, and the second player who operates the second character 92 causes the second character 92 to move freely (with the second degree of freedom) while viewing the screens of the television 2 and the terminal device 7. Since the second player can cause the second character 92 to move freely, the second player can play the game under conditions more advantageous than those for the first player. On the other hand, the first player plays the game under the predetermined limit, however, since the first character 91 automatically moves, the first player does not need to perform an operation for moving the first character 91, and can play the game by performing a simple operation (an operation of swing the controller 5 in order to attack the enemy character 93). Therefore, for example, a player who is good at playing the game may use the terminal device 7 to operate the second character 92, and a player or players who are not good at playing the game may use the controller 5 to operate the first character 91, whereby a plurality of players can cooperate with each other to play the game irrespective of the level of skill. For example, when the first character 91 which is operated by a player who is not good at playing the game is likely to be attacked by the enemy character 93, a player who is good at playing the game can freely operate the second character 92 to kill or beat the enemy character 93. Since the second character 92 can attack using the arrow object 97, the second character 92 can attack the enemy character 93 which is located further away from the second character 92. Therefore, the second player can be said to have an advantage over the first player, and therefore, to be qualified to play the game while helping the first player. Conversely, a player who is good at playing the game may operate the first character 91, and a player who is not good at playing the game may operate the second character 92. In some games in which a plurality of players play under the same conditions (with the same degree of freedom), each player may perform an arbitrary operation to interfere with the course of the game. However, in the game of the present embodiment, the movement of the first character 91 is limited, and therefore, each player is prevented from arbitrarily operating the corresponding player character and therefore interfering with the course of the game. In the present embodiment, each player can play the game in his or her role with his or her degree of freedom.

In the present embodiment, the first virtual cameras corresponding to the respective first characters 91 are set in the game space, and the second virtual camera corresponding to the second character 92 is set in the game space. Images captured by the first virtual cameras and the second virtual camera are displayed on the screen of the television 2. Moreover, the third virtual camera corresponding to the second character 92 is set in the game space, and an image captured by the third virtual camera is displayed on the LCD 51 of the terminal device 7. As a result, one first player can recognize situations of the other first players and the second player by viewing the screen of the television 2. The second player can view the two screens, thereby playing the game based on a greater amount of information than that for the first players.

In the present embodiment, if the enemy character 93 is present behind the second character 92 (at the rear of a line extending through the second character 92 in the left-right direction; a direction of 90 to 180 degrees or −180 to −90 degrees), the second character 92 is more easily caused to face the enemy character 93. Specifically, if the enemy character 93 is located behind the second character 92, then even when the down direction is input using the left analog stick 53A, the second character 92 turns without (or while) retreating or moving backward. Also, if the enemy character 93 is located behind the second character 92, then when the terminal device 7 is rotated in a direction which causes the second character 92 to face the enemy character 93, the second character 92 is rotated by a larger rotation amount than that of the terminal device 7. Thus, the second character 92 is more easily caused to face the enemy character 93 based on a position relationship between the second character 92 and the enemy character 93. Therefore, even if the enemy character 93 is located behind the second character 92, the second player can easily cause the second character 92 to face the enemy character 93.

[7. Variations]

The above embodiment is merely illustrative. In other embodiments, for example, configurations described below may be used.

For example, in the present embodiment, three of four players operate the controller 5, and one player operates the terminal device 7. In another embodiment, a plurality of terminal devices 7 may be connected to the game device 3 (by a wireless connection), and a plurality of players may operate the respective corresponding terminal devices 7. In another embodiment, there may be four or more players. Alternatively, two players may play the game, where one player operates the controller 5, and the other player operates the terminal device 7.

In the present embodiment, a plurality of players cooperate with each other to play the game. In another embodiment, a game may be provided in which a plurality of players fight with each other. The present exemplary embodiment may be applicable to any game which is played by a plurality of players.

In the present embodiment, the second and third virtual cameras corresponding to the second character 92 are set in the game space, an image captured by the second virtual camera is displayed on the television 2, and an image captured by the third virtual camera is displayed on the terminal device 7. In another embodiment, an image captured by the second virtual camera (an image corresponding to the second character 92) may not be displayed on the television 2. In this case, an image of the game space as viewed from behind the second character 92 is not displayed on the television 2, and therefore, it is difficult for the first player to recognize the situation of the second character 92. The game can be played without recognizing the situation of the second character 92.

In the present embodiment, an image captured by the third virtual camera is displayed on the terminal device 7. In another embodiment, an image corresponding to a motion of the second character 92 may be displayed on the terminal device 7. Here, the image corresponding to a motion of the second character 92 may be an image which is changed based on the motion of the second character 92, or may or may not be an image of the game space captured by a virtual camera. For example, a map image for showing the position and orientation in the game space of each character (91, 92, 93) may be displayed on the terminal device 7.

In the present embodiment, the first character 91 automatically moves along a predetermined path (the orientation and position of the first character 91 change automatically), and the second character 92 moves on a two-dimensional plane in the game space in a direction which is input by the second player. In another embodiment, the first character 91 may move in response to an operation performed by the first player based on a predetermined path. For example, when an operation portion corresponding to the up direction of the cross button 32a of the controller 5 is pressed, the first character 91 may move forward on the predetermined path. Alternatively, for example, the first character 91 may move within a predetermined range containing the predetermined path, automatically or by a player's operation. Alternatively, for example, only the orientation of the first character 91 may be controlled by a player, and the movement amount of the first character 91 may be automatically controlled. Alternatively, only the movement amount of the first character 91 may be controlled by a player, and the orientation of the first character 91 may be automatically controlled. In another embodiment, the second character 92 may move based on the second player's operation within a limited range (larger than the movement range of the first character 91) on a two-dimensional plane. That is, the first character 91 moves with the first degree of freedom, and the second character 92 moves with the second degree of freedom higher than the first degree of freedom. Here, the term "degree of freedom" indicates to what degree a player can freely control a character. For example, the degree of freedom may indicate to what degree a player can freely control the position of a character, or to what degree a player can freely control the orientation of a character. For example, the degree of freedom may indicate a range (position) in the game space within which a character is allowed to move in response to a player's operation, or to what degree the orientation in the game space of a character can be changed in response to a player's operation. The degree of freedom may indicate to what degree a character perform a motion freely in response to a player's operation. For example, since the first character 91 normally automatically moves on a predetermined path (the position and orientation are automatically determined by the game device 3), the range in the game space within which the first character 91 is allowed to move can be said to be smaller than that of the second character 92. Since the orientation of the first character 91 is automatically determined by the game device 3, the degree of freedom of the orientation of the first character 91 can be said to be lower than that of the second character 92. Therefore, the degree of freedom of the first character 91 is lower than that of the second character 92.

In the present embodiment, if the enemy character 93 is not located behind the second character 92, then when the down direction is input using the left analog stick 53A, the second character 92 is caused to retreat or move backward rather than turning. In another embodiment, in a similar case, the second character 92 may be caused to turn while moving.

In the present embodiment, if the enemy character 93 is not located behind the second character 92, then when the down direction is input using the left analog stick 53A, the second character 92 is caused to retreat or move backward. If the enemy character 93 is located behind the second character 92, then when the down direction is input using the left analog stick 53A, the second character 92 is caused to turn rather than retreating or moving backward. In another embodiment, if the enemy character 93 is located behind the second character 92, then when the down direction is input using the left analog stick 53A, the second character 92 may be caused to turn while a backward movement is limited (the movement amount is set to zero or is reduced). In another embodiment, if the enemy character 93 is located behind the second character 92, the amount of turn of the second character 92 may be set to be greater than when the enemy character 93 is not located behind the second character 92.

That is, in another embodiment, if the enemy character 93 is located behind the second character 92, then when the down direction is input using the left analog stick 53A, the stick rotation angle (control data representing a rotation direction and a rotation amount) may be adjusted so that the second character 92 is more easily caused to face the enemy character 93.

In the present embodiment, if the enemy character 93 is located behind the second character 92, the rotation amount of the second character 92 caused by the rotation of the terminal device 7 is set to be greater than when the enemy character 93 is not located behind the second character 92. That is, if the enemy character 93 is located behind the second character 92, the gyroscopic sensor rotation angle (control data representing a rotation direction and a rotation amount) is adjusted so that the second character 92 is more easily caused to face the enemy character 93.

As described above, if the enemy character 93 is located behind the second character 92, control data representing a rotation direction and a rotation amount of the second character 92 may be adjusted so that the second character 92 is more easily caused to face the enemy character 93.

In the present embodiment, if the enemy character 93 is located behind the second character 92, the control data is adjusted so that the second character 92 is more easily caused to face the enemy character 93. In another embodiment, if the enemy character 93 is located behind the second character 92, the control data may be adjusted so that the second character 92 is more easily caused to face a direction opposite to the enemy character 93. For example, the control data may be adjusted so that the second character 92 is more easily caused to escape from a strong enemy. In another embodiment, if the enemy character 93 is located in front of the second character 92, the control data may be adjusted so that the second character 92 is more easily caused to face in a direction opposite to the enemy character 93.

That is, if there is a predetermined position relationship between a player object and another predetermined object, control data representing a rotation direction and a rotation amount of the player object may be adjusted so that the player object is easily caused to face in a predetermined direction.

In another embodiment, a front direction degree indicating to what degree the enemy character 93 is located in front of the second character 92 (how much the enemy character 93 is closer to a position directly in front of the second character 92) may be calculated instead of the back direction degree BR, and the control data may be adjusted based on the front direction degree. In this case, the front direction degree increases with a decrease in the angle determined by the second character 92 and the enemy character 93. Alternatively, a right direction degree may be calculated instead of the back direction degree BR, and the control data may be adjusted based on the right direction degree. That is, a degree corresponding to an angle of the enemy character 93 is calculated with reference to a specific direction of the second character 92, and the control data may be adjusted based on the degree. The degree indicates to what degree the enemy character 93 is located in a specific direction (e.g., the rear direction) with reference to the second character 92 (how much the enemy character 93 is closer to a position in the specific direction). The degree increases as the enemy character 93 is located in a direction closer to the specific direction with reference to the second character 92. More specifically, the degree indicates a degree of a match between a specific direction (e.g., a rear direction, a right direction, a front direction, etc.) as viewed from the second character 92, and a direction from the position of the second character 92 to the position of the enemy character 93.

In the present embodiment, the position and orientation of the second character 92 are controlled based on an input operation performed on the left analog stick 53A of the terminal device 7. In another embodiment, the position and orientation of the second character 92 may be controlled based on an input operation performed on other buttons (an operation portion for inputting a direction, such as the cross button 54A).

In the present embodiment, an arrow object is used to attack the enemy character 93. In another embodiment, any weapon may be used, including, for example, a spherical object (a ball, etc.), a bullet, a cannonball, a spear, a boomerang, etc.

In the present embodiment, the game device 3 generates and transmits a terminal game image to the terminal device 7 via wireless communication, and the terminal device 7 displays the terminal game image. In another embodiment, the terminal device 7 may generate and display a terminal game image on a display section (the LCD 51) of the terminal device 7. In this case, the game device 3 transmits information (a position, an attitude, etc.) about a character or a virtual camera in the game space to the terminal device 7, which in turn generates a terminal game image based on the information.

In the present embodiment, the attitude of the terminal device 7 is calculated based on an angular velocity detected by a gyroscopic sensor. In another embodiment, the attitude of the terminal device 7 calculated based on the angular velocity detected by the gyroscopic sensor may be corrected based on an acceleration detected by an acceleration sensor, or the attitude of the terminal device 7 may be calculated based on the acceleration detected by the acceleration sensor. That is, the attitude of the terminal device 7 may be calculated using one or more inertial sensors (an acceleration sensor, a gyroscopic sensor). In another embodiment, the attitude of the terminal device 7 may be calculated based on an azimuth detected by a magnetic sensor (a direction indicated by the geomagnetism detected by a magnetic sensor). In another embodiment, the attitude of the terminal device 7 may be calculated using an image of the terminal device 7 captured using a camera, etc. Alternatively, the terminal device 7 outputs attitude data (data representing a detection value of an inertial sensor, data representing a detection value of a magnetic sensor, image data changing depending on the attitude of the terminal device 7, etc.) based on the attitude of the terminal device 7, and based on the attitude data, the game device 3 may obtain (calculate) the attitude of the terminal device 7.

In another embodiment, a part of the game process executed by the game device 3 may be executed by the terminal device 7. For example, a position, an attitude, a motion, etc. of an object in the game space operated using the terminal device 7 may be determined in the terminal device 7, and the determined information may be transmitted to the game device 3. Alternatively, the terminal device 7 may calculate its own attitude and transmit information about the attitude to the game device 3. The other game process may be executed by the game device 3 based on the received information.

In the present embodiment, the game program is executed by the game device 3. In another embodiment, the game program may be executed in a general information processing device (a personal computer, a smartphone, etc.) instead of a game-specialized device. That is, in another embodiment, a general information processing device may function as a game device by executing the game program.

The game program may be stored in a storage medium such as a magnetic disk, a non-volatile memory, etc., instead of an optical disc. The game program may be stored in a computer readable storage medium such as a RAM, a magnetic disk, etc., on a server connected to a network, and may be provided via the network. The game program may be read as a source code into an information processing device, and may be compiled and executed when the program is executed.

In the above embodiment, the process of the flowchart is performed by the CPU 10 of the game device 3 executing the game program. In another embodiment, the whole or a part of the process may be performed using a dedicated circuit included in the game device 3 or a general-purpose processor. At least one processor may operate as a "programmed logic circuit" for executing the process.

In another embodiment, in a game system having a plurality of information processing devices which can communicate with each other, the plurality of information processing devices may share the load of the game process executed by the game device 3. For example, the game system may include a plurality of information processing devices connected to a network such as the Internet. In this case, for example, a player performs a game operation on an operation device or a portable display device connectable to the network (e.g., the terminal device 7 of the above embodiment, and an operation device having a display device, such as a tablet-type computer, a smartphone, etc.). Operation information corresponding to the game operation is transmitted to another information processing device via the network, and the other information processing device executes a game process based on the received operation information, and transmits the execution result to the operation device or the portable display device.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above. The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art. Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system for controlling a player object provided in a virtual world, comprising:
   a game device including at least one processor configured to:
   obtain input data representing an input operation performed by a player using an input device in order to rotate the player object to face a predetermined other object;
   set, based on the input data, control data representing a direction and amount of a change in an orientation of the player object in the virtual world;
   adjust the set control data by automatically changing the set control data to increase a degree of rotation of the player object when the player object and the predetermined other object have the predetermined position relationship so that when the player object and the predetermined other object have the predetermined position relationship, use of the input device to rotate the player object to face the predetermined other object is easier for the player compared to when the player object and the predetermined other object do not have the predetermined position relationship; and
   change the orientation of the player object based on the adjusted control data.

2. The game system of claim 1, wherein the at least one processor is configured to automatically adjust the set control data so that the player object is rotated to face the other object.

3. The game system of claim 2, wherein the at least one processor is configured to adjust the set control data so that when the other object is located behind the player object, the player object is rotated to face the other object.

4. The game system of claim 1, wherein the at least one processor is further configured to:
   calculate a degree of an angle between a specific direction as viewed from the player object and a direction from the player object toward the other object; and
   adjust the control data based on the degree.

5. The game system of claim 4, wherein the degree increases as the other object is closer to a position directly behind the player object, and wherein the at least one processor is further configured to
   automatically adjust the set control data so that the player object is rotated more to face the other object as the degree increases.

6. The game system of claim 1, wherein
   the input data includes attitude data based on the attitude of the input device,
   the at least one process being further configured to obtain the attitude of the input device based on the attitude data, and
   to set the control data based on the attitude of the input device.

7. The game system of claim 6, wherein the at least one processor is further
   configured to set the control data so that the orientation of the player object is changed by a first change amount corresponding to a change amount of the attitude of the input device, and
   to automatically adjust the set control data so that when the player object and the other object have the predetermined position relationship, the orientation of the player object is changed by a second change amount larger than the first change amount.

8. The game system of claim 7, wherein the at least one processor is further
   configured to set the control data so that the orientation of the player object is changed toward a direction in the virtual world corresponding to a direction in which the attitude of the input device has been changed, by the first change amount corresponding to the change amount of the attitude of the input device, and
   to automatically adjust the control data so that when the direction in the virtual world corresponding to the direction in which the attitude of the input device has been changed is a direction in which the player object faces the other object, the orientation of the player object is changed by the second change amount larger than the first change amount.

9. The game system of claim 1, wherein
   the input data includes direction data corresponding to an input operation performed on a direction input section included in the input device, and wherein the at least one processor is further
   configured to set the control data based on the direction data.

10. The game system of claim 9, wherein the at least one processor is further
    configured to cause the player object to move in the virtual world based on the direction data.

11. The game system of claim 10, wherein
    when the player object and the other object have the predetermined position relationship, then if a movement direction of the player object represented by the direction data is a direction in which the player object faces the other object, the at least one processor is configured to limit a movement of the player object, and
    to automatically adjust the set control data so that when the player object and the other object have the predetermined position relationship, then if the movement direction of the player object represented by the direction data is a direction in which the player object faces the other object, the player object is rotated to face the other object.

12. The game system of claim 1, wherein
    the input device is a portable display device including a display,
    and wherein the at least one processor is further configured to
    set a virtual camera in the virtual world based on the orientation of the player object, and
    cause the display to display an image of the virtual world captured by the virtual camera.

13. The game system of claim 1, wherein
    the other object is an enemy object which is allowed to move in the virtual world, and wherein the at least one processor is further configured to
    cause the player object to attack the enemy object based on the input data.

14. A game processing method performed by at least one computer processor included in a game system for controlling a player object provided in a virtual world comprising:
    obtaining input data representing an input operation performed by a player using an input in order to rotate the player object to face a predetermined other object;
    setting, based on the input data and using the at least one computer processor, control data representing a direction and amount of a change in an orientation of the player object in the virtual world;

adjusting the set control data by automatically changing the set control data to increase a degree of rotation of the player object when the player object and the predetermined other object have a predetermined position relationship so that when the player object and the predetermined other object have the predetermined position relationship, use of the input device to rotate the player object to face the predetermined other object is easier for the player compared to when the player object and the predetermined other object do not have the predetermined position relationship; and changing, the orientation of the player object based on the adjusted control data.

15. The game processing method of claim 14, wherein
The set control data is automatically adjusted so that the player object is rotated to face the other object.

16. The game processing method of claim 15, wherein
the set control data is automatically adjusted so that when the other object is located behind the player object, the player object is rotated to face the other object.

17. The game processing method of claim 14, further comprising:
calculating a degree of an angle between a specific direction as viewed from the player object and a direction from the player object toward the other object,
wherein
the control data is adjusted based on the degree.

18. The game processing method of claim 17, wherein
the degree increases as the other object is closer to a position directly behind the player object, and
the set control data is automatically a adjusted so that the player object is rotated more to face the other object as the degree increases.

19. The game processing method of claim 14, wherein
the input data includes attitude data based on the attitude of the input device,
the game processing method further includes obtaining the attitude of the input device based on the attitude data, and
the control data is set based on the attitude of the input device.

20. The game processing method of claim 19, wherein
the control data is set so that the orientation of the player object is changed by a first change amount corresponding to a change amount of the attitude of the input device, and
the control data is adjusted so that when the player object and the other object have the predetermined position relationship, the orientation of the player object is changed by a second change amount larger than the first change amount.

21. The game processing method of claim 20, wherein
the control data is set so that the orientation of the player object is changed toward a direction in the virtual world corresponding to a direction in which the attitude of the input device has been changed, by the first change amount corresponding to the change amount of the attitude of the input device, and
the control data is set so that when the direction in the virtual world corresponding to the direction in which the attitude of the input device has been changed is a direction in which the player object faces the other object, the orientation of the player object is changed by the second change amount larger than the first change amount.

22. The game processing method of claim 14, wherein
the input data includes direction data corresponding to an input operation performed on a direction input section included in the input device, and
the control data is set based on the direction data.

23. The game processing method of claim 22, further comprising:
causing the player object to move in the virtual world based on the direction data.

24. The game processing method of claim 23, wherein
when the player object and the other object have the predetermined position relationship, then if a movement direction of the player object represented by the direction data is a direction in which the player object faces the other object, a movement of the player object is limited, and
the control data is adjusted so that when the player object and the other object have the predetermined position relationship, then if the movement direction of the player object represented by the direction data is a direction in which the player object faces the other object, the player object is caused to face the other object.

25. The game processing method of claim 14, wherein
the input device is a portable display device including a display,
the game processing method further includes
setting a virtual camera in the virtual world based on the orientation of the player object, and
causing the display to display an image of the virtual world captured by the virtual camera.

26. The game processing method of claim 14, wherein
the other object is an enemy object which is allowed to move in the virtual world, and
the game processing method further includes causing the player object to attack the enemy object based on the input data.

27. A non-transitory computer readable storage medium storing a game program which, when executed by a computer included in a game device for controlling a player object provided in a virtual world, causes the computer to perform operations comprising:
obtaining input data representing an input operation performed by a player using an input device in order to rotate the player object to face a predetermined other object;
setting, based on the input data, control data representing a direction and amount of a change in an orientation of the player object in the virtual world;
adjusting the set control data by automatically changing the set control data to increase a degree of rotation of the player object when the player object and the predetermined other object have a predetermined position relationship so that when the player object and the predetermined other object have the predetermined position relationship, use of the input device to rotate the player object to face the predetermined other object is easier for the player compared to when the player object and the predetermined other object do not have the predetermined position relationship; and
changing the orientation of the player object based on the adjusted control data.

28. A game device for controlling a player object provided in a virtual world, comprising:
a processing system, including at least one computer processor, the processing system being configured to:

obtain input data representing an input operation performed by a player using an input device in order to rotate the player object to face a predetermined other object;

set, based on the input data, control data representing a direction and amount of a change in an orientation of the player object in the virtual world;

adjust the set control data by automatically changing the set control data to increase a degree of rotation of the player object when the player object and the predetermined other object have the predetermined position relationship so that when the player object and the predetermined other object have the predetermined position relationship, use of the input device to rotate the player object to face the predetermined other object is easier for the player compared to when the player object and the predetermined other object do not have the predetermined position relationship; and change the orientation of the player object based on the adjusted control data.

* * * * *